(12) United States Patent
Mynarcik

(10) Patent No.: US 12,478,571 B2
(45) Date of Patent: Nov. 25, 2025

(54) ENZYME BASED COMPOSITIONS AND METHODS FOR REMOVING DENTAL CALCULI

(71) Applicant: PONTIS BIOLOGICS, INC., Huntington, NY (US)

(72) Inventor: Dennis C. Mynarcik, Huntington, NY (US)

(73) Assignee: PONTIS BIOLOGICS, INC., Huntington, NY (US)

( * ) Notice: Subject to any disclaimer, the term of this patent is extended or adjusted under 35 U.S.C. 154(b) by 406 days.

(21) Appl. No.: 18/150,712

(22) Filed: Jan. 5, 2023

(65) Prior Publication Data

US 2023/0346675 A1 Nov. 2, 2023

Related U.S. Application Data

(63) Continuation-in-part of application No. 17/415,359, filed as application No. PCT/US2019/066969 on Dec. 17, 2019, now abandoned.

(60) Provisional application No. 62/780,565, filed on Dec. 17, 2018.

(51) Int. Cl.
| | |
|---|---|
| *A61K 8/66* | (2006.01) |
| *A61Q 11/00* | (2006.01) |
| *C12N 9/22* | (2006.01) |
| *C12N 9/38* | (2006.01) |
| *C12N 9/76* | (2006.01) |

(52) U.S. Cl.
CPC ............... *A61K 8/66* (2013.01); *A61Q 11/00* (2013.01); *C12N 9/22* (2013.01); *C12N 9/2471* (2013.01); *C12N 9/6427* (2013.01); *A61K 2800/74* (2013.01); *A61K 2800/92* (2013.01); *C12Y 301/11004* (2013.01); *C12Y 302/01023* (2013.01); *C12Y 304/21001* (2013.01)

(58) Field of Classification Search
CPC ..................................................... A61Q 11/00
USPC ........................................................ 424/49
See application file for complete search history.

(56) References Cited

U.S. PATENT DOCUMENTS

| | | |
|---|---|---|
| 3,418,208 A | 12/1968 | Coty |
| 3,689,638 A | 9/1972 | Harth et al. |
| 3,721,569 A | 3/1973 | Steinkraus |
| 3,791,932 A | 2/1974 | Schuurs et al. |
| 3,839,153 A | 10/1974 | Schuurs et al. |
| 3,850,578 A | 11/1974 | McConnell |
| 3,850,752 A | 11/1974 | Schuurs et al. |
| 3,853,987 A | 12/1974 | Dreyer |
| 3,867,517 A | 2/1975 | Ling |
| 3,879,262 A | 4/1975 | Schuurs et al. |
| 3,901,654 A | 8/1975 | Gross |
| 3,935,074 A | 1/1976 | Rubenstein et al. |
| 3,984,533 A | 10/1976 | Uzgiris |
| 3,996,345 A | 12/1976 | Ullman et al. |
| 4,034,074 A | 7/1977 | Miles |
| 4,098,876 A | 7/1978 | Piasio et al. |
| 4,666,828 A | 5/1987 | Gusella |
| 4,683,202 A | 7/1987 | Mullis |
| 4,801,531 A | 1/1989 | Frossard |
| 4,879,219 A | 11/1989 | Wands et al. |
| 5,011,771 A | 4/1991 | Bellet et al. |
| 5,192,659 A | 3/1993 | Simons |
| 5,272,057 A | 12/1993 | Smulson et al. |
| 5,281,521 A | 1/1994 | Trojanowski et al. |
| 5,464,764 A | 11/1995 | Capecchi et al. |
| 5,487,992 A | 1/1996 | Capecchi et al. |
| 5,672,485 A | 9/1997 | Foster et al. |
| 5,906,743 A | 5/1999 | Cohen et al. |
| 6,265,024 B1 | 7/2001 | England |
| 6,398,039 B1 | 6/2002 | Xue et al. |
| 6,835,390 B1 | 12/2004 | Vein |
| 7,270,829 B2 | 9/2007 | Van Eelen |
| 8,703,216 B2 | 4/2014 | Forgacs et al. |
| 8,802,361 B2 | 8/2014 | Lee et al. |
| 9,302,038 B2 | 4/2016 | Stange |
| 2002/0037260 A1 | 3/2002 | Budny et al. |
| 2003/0054544 A1 | 3/2003 | Gruenberg |
| 2006/0019385 A1 | 1/2006 | Smith et al. |
| 2008/0069782 A1 | 3/2008 | Goodman et al. |
| 2008/0233244 A1 | 9/2008 | Swenson |
| 2010/0061971 A1 | 3/2010 | Genkin et al. |

(Continued)

FOREIGN PATENT DOCUMENTS

| | | |
|---|---|---|
| CN | 1930281 A | 3/2007 |
| CN | 101434902 A | 5/2009 |

(Continued)

OTHER PUBLICATIONS

International Search Report and Written Opinion mailed Apr. 21, 2020 for corresponding International Patent Application No. PCT/US2019/066969, 11 pages.

(Continued)

*Primary Examiner* — Walter E Webb

(74) *Attorney, Agent, or Firm* — Polsinelli PC

(57) ABSTRACT

Disclosed are compositions and formulations comprising enzymes or other biocatalyst that cleave surface-accessible DNA polymers and/or glycoprotein carbohydrate chains at galactose residues in dental calculus, and optionally further include one or more proteolytic enzymes, thereby destroying the structural integrity of the calculus, and allowing it to be readily removed without requiring special treatment by a trained dental professional. Also disclosed are methods for removing dental calculus using the disclosed compositions and formulations.

21 Claims, 5 Drawing Sheets

Specification includes a Sequence Listing.

(56) References Cited

U.S. PATENT DOCUMENTS

| | | | |
|---|---|---|---|
| 2010/0197007 A1 | 8/2010 | Cailleret et al. | |
| 2011/0091604 A1 | 4/2011 | Miller | |
| 2011/0301249 A1 | 12/2011 | Challakere | |
| 2012/0093994 A1 | 4/2012 | Hsieh et al. | |
| 2012/0288916 A1 | 11/2012 | Sandig et al. | |
| 2013/0323708 A1 | 12/2013 | Yarmush et al. | |
| 2015/0289541 A1 | 10/2015 | Brown et al. | |
| 2015/0305390 A1 | 10/2015 | Vrljic et al. | |
| 2016/0339377 A1 | 11/2016 | Arakawa et al. | |
| 2017/0087199 A1* | 3/2017 | Patron | A61K 31/381 |
| 2018/0092939 A1 | 4/2018 | Onsoyen et al. | |
| 2020/0080050 A1 | 3/2020 | Nahmias | |

FOREIGN PATENT DOCUMENTS

| | | | |
|---|---|---|---|
| CN | 101709266 A | 5/2010 | |
| CN | 103298922 A | 9/2013 | |
| CN | 104096232 A | 10/2014 | |
| CN | 105796428 A | 7/2016 | |
| EP | 0425016 A2 | 5/1991 | |
| EP | 0425018 A2 | 5/1991 | |
| EP | 2428572 A2 | 3/2012 | |
| JP | 2001039740 A | 2/2001 | |
| JP | 2018166466 A | 11/2018 | |
| WO | 2000046354 A1 | 8/2000 | |
| WO | 03/094879 A1 | 11/2003 | |
| WO | 2003094879 A1 | 11/2003 | |
| WO | 2008112459 A1 | 9/2008 | |
| WO | 2008112459 A2 | 9/2008 | |
| WO | 2009121183 A1 | 10/2009 | |
| WO | 2011002926 A1 | 1/2011 | |
| WO | WO-2013063695 A1 * | 5/2013 | A61K 31/194 |
| WO | 2014078579 A1 | 5/2014 | |
| WO | 2015066377 A1 | 5/2015 | |
| WO | 2015118148 A1 | 8/2015 | |
| WO | 2017066719 A1 | 4/2017 | |
| WO | 2017066719 A2 | 4/2017 | |
| WO | 2018011805 A2 | 1/2018 | |
| WO | 2018206553 A1 | 11/2018 | |

OTHER PUBLICATIONS

Canadian Application No. 3,149,789 Office action dated Jan. 17, 2024, 6 pages.

Colleluori, G. et al., "Mammary gland adipocytes in lactation cycle, obesity and breast cancer", Reviews in Endocrine and Metabolic Disorders, Mar. 22, 2021, pp. 22:241-255. 2.

Giordano, A. et al. "Mechanisms in endocrinology: white, brown and pink adipocytes: the extraordinary plasticity of the adipose organ," European journal of Endocrinology, vol. 170, Issue 5, May 1, 2014, pp. R159-R171.

Pastika, L. et al., "Spontaneous immortalization of chicken fibroblasts generates stable, high-yield cell lines for serum-free production of cultured meat," Nature Food, vol. 4, Dec. 22, 2022, plus Supplementary Data, pp. 35-50. 1.

Wikipedia, "Adipocyte," retrieved from https://en.wikipedia.org/w/index.php?title=Adipocyte&oldid=1190135332, downloaded Jun. 20, 2024. 5.

Ye, R. Z. et al., "Fat Cell Size: Measurement Methods, Pathophysiological Origins, and Relationships With Metabolic Dysregulations", Endocrine Reviews, vol. 43, Issue 1, Feb. 2022, pp. 35-60.

Das Theerthankar et al, "Glutathione Enhances Antibiotic Efficiency and Effectiveness of DNase I in Disrupting Pseudomonas aeruginosa Biofilms While Also Inhibiting Pyocyanin Activity, Thus Facilitating Restoration of Cell Enzymatic Activity, Confluence and Viability", Frontiers in Microbiology, (20171214), vol. 8, doi: 10.3389/fmicb.2017.02429, XP055957058.

Takenaka Shoji et al, "Current and future strategies for the control of mature oral biofilms—Shift from a bacteria-targeting to a matrix-targeting approach", Journal of Oral Biosciences, (Nov. 1, 2012), vol. 54, No. 4, doi:10.1016/j.job.2012.09.002, ISSN 1349-0079, pp. 173-179, XP055957880.

Das et al., "Glutathione Enhances Antibiotic Efficiency and Effectiveness of DNase I in Disrupting Pseudomonas aeruginosa Biofilms While Also Inhibiting Pyocyanin Activity, Thus Facilitating Restoration of Cell Enzymatic Activity, Confluence and Viability", Frontiers in Microbiology, Dec. 14, 2017, vol. 8.

European Partial Search Report relating to European Application No. EP19897706, dated Sep. 16, 2022; 14 pgs.

European Search Report relating to European Application No. EP19897706, dated Dec. 20, 2022; 15 pgs.

International Search Report and Written Opinion mailed Apr. 21, 2020 for corresponding International Patent Application No. PCT/US2019/066969, 12 pages.

Karygianni et al., "Combined DNase and Proteinase Treatment Interferes with Composition and Structural Integrity of Multispecies Oral Biofilms", Journal of Clinical Medicine, Apr. 1, 2020, pp. 1-15, vol. 9, No. 4, 983.

Takenaka et al., "Current and future strategies for the control of mature oral biofilms—Shift from a bacteria-targeting to a matrix-targeting approach", Journal of Oral Biosciences, Nov. 1, 2012, pp. 173-179, vol. 54, No. 4.

* cited by examiner

SEQUENCE LISTING

Sequence total quantity: 6
SEQ ID NO: 1          moltype = AA   length = 282
FEATURE               Location/Qualifiers
source                1..282
                      mol_type = protein
                      organism = Bos taurus
SEQUENCE: 1
MRGTRLMGLL LALAGLLQLG LSLKIAAFNI RTFGETKMSN ATLASYIVRI VRRYDIVLIQ    60
EVRDSHLVAV GKLLDYLNQD DPNTYHYVVS EPLGRNSYKE RYLFLFRPNK VSVLDTYQYD   120
DGCESCGNDS FSREPAVVKF SSHSTKVKEF AIVALHSAPS DAVAEINSLY DVYLDVQQKW   180
HLNDVMLMGD FNADCSYVTS SQWSSIRLRT SSTFQWLIPD SADTTATSTN CAYDRIVVAG   240
SLLQSSVVPG SAAPFDFQAA YGLSNEMALA ISDHYPVEVT LT                      282

SEQ ID NO: 2          moltype = AA   length = 245
FEATURE               Location/Qualifiers
source                1..245
                      mol_type = protein
                      organism = Bos taurus
SEQUENCE: 2
CGVPAIQPVL SGLSRIVNGE EAVPGSWPWQ VSLQDKTGFH FCGGSLINEN WVVTAAHCGV    60
TTSDVVVAGE FDQGSSSEKI QKLKIAKVFK NSKYNSLTIN NDITLLKLST AASFSQTVSA   120
VCLPSASDDF AAGTTCVTTG WGLTRYTNAN TPDRLQQASL PLLSNTNCKK YWGTKIKDAM   180
ICAGASGVSS CMGDSGGPLV CKKNGAWTLV GIVSWGSSTC STSTPGVYAR VTALVNWVQQ   240
TLAAN                                                               245

SEQ ID NO: 3          moltype = AA   length = 13
FEATURE               Location/Qualifiers
source                1..13
                      mol_type = protein
                      organism = Synthetic construct
SEQUENCE: 3
CGVPAIQPVL SGL                                                       13

SEQ ID NO: 4          moltype = AA   length = 133
FEATURE               Location/Qualifiers
source                1..133
                      mol_type = protein
                      organism = synthetic construct
SEQUENCE: 4
SRIVNGEEAV PGSWPWQVSL QDKTGFHFCG GSLINENWVV TAAHCGVTTS DVVVAGEFDQ    60
GSSSEKIQKL KIAKVFKNSK YNSLTINNDI TLLKLSTAAS FSQTVSAVCL PSASDDFAAG   120
TTCVTTGWGL TRY                                                     133

SEQ ID NO: 5          moltype = AA   length = 97
FEATURE               Location/Qualifiers
source                1..97
                      mol_type = protein
                      organism = synthetic construct
SEQUENCE: 5
ANTPDRLQQA SLPLLSNTNC KKYWGTKIKD AMICAGASGV SSCMGDSGGP LVCKKNGAWT    60
LVGIVSWGSS TCSTSTPGVY ARVTALVNWV QQTLAAN                             97

```
SEQ ID NO: 6           moltype = AA  length = 653
FEATURE                Location/Qualifiers
source                 1..653
                       mol_type = protein
                       organism = Bos taurus
SEQUENCE: 6
MPGVVRLLAL LLVPLLLGSA RGLHNATQRT FQIDYRRNRF LKDGQPFRYI SGSIHYFRVP    60
RFYWKDRLLK MKMAGLNAIQ TYVAWNFHEL QPGRYNFSGD HDVEHFIQLA HELGLLVILR   120
PGPYICAEWD MGGLPAWLLE KKSIVLRSSD PDYLAAVDKW LGVLLPKMRP LLYKNGGPII   180
TVQVENEYGS YLSCDYDYLR FLQKRFHDHL GEDVLLFTTD GVNERLLQCG ALQGLYATVD   240
FSPGTNLTAA FMLQRKFEPT GPLVNSEFYT GWLDHWGQRH STVSSKAVAF TLHDMLALGA   300
NVNMYMFIGG TNFAYWNGAN IPYQPQPTSY DYDAPLSEAG DLTEKYFALR DIIQKFAKVP   360
EGPIPPSTPK FAYGKVALNK LKTVEDALNI LCPSGPIKSV YPLTFIDVKQ YFGFVLYRTM   420
LPEDCSDPTP LSSPLSGVHD RAYVSVNGVA QGILERESVI TLNITGKAGA TLDLLVENMG   480
RVNYGSSIND FKGLVSNLTL GSKILTNWEI FPLDMEDAVR SHLGTWGGRD RGYHNKARAH   540
SPPTYALPTF YVGNFTIPSG IADLPQDTFI QFPGWTKGQV WINGFNLGRY WPVRGPQMTL   600
FVPQHILVTS TPNTIVVLEL EHAPCQDGGP ELCTVEFVDK PVFRTVQTHR HAN          653
```

ENZYME BASED COMPOSITIONS AND METHODS FOR REMOVING DENTAL CALCULI

CROSS REFERENCE TO RELATED APPLICATIONS

The present application is a continuation-in-part of the U.S. Non-Provisional patent application Ser. No. 17/415,359 filed on Jun. 17, 2021, which is a 371 national stage application of PCT/US19/66969, filed on Dec. 17, 2019 which, in turn, claims the benefit of U.S. Provisional Patent Application No. 62/780,565, entitled, "COMPOSITIONS AND METHODS FOR REMOVING DENTAL CALCULI" filed Dec. 17, 2018. The contents of each of the aforementioned applications is hereby incorporated by reference in its entirety.

INCORPORATION OF SEQUENCE LISTING

The present application contains a Sequence Listing which has been submitted in XML format via Patent Center and is hereby incorporated by reference in its entirety. Said WIPO Sequence Listing was created on Jan. 5, 2023, is named 119879-749227_Sequence_Listing.xml, and is 8 kilobytes in size.

FIELD

The present disclosure relates to compositions and methods for reducing and removing dental plaque and calculus in human and non-human animals.

BACKGROUND

Dental tartar, also referred to as dental calculus, is a fossilized/mineralized substance that, if not removed, progressively accumulates and ultimately leads to periodontal diseases such as gingivitis and periodontitis resulting in a chronic inflammatory state that can predispose to diabetes or heart disease in humans and non-human animals, including but not limited to dogs and cats. Presently, methods of removing calculus are performed by trained dental professionals at best once or twice a year and are essentially limited to scraping of the tooth surface using metal alloy dental picks or an ultrasonic device to fragment and dislodge the calculus from tooth enamel. Calculus is not effectively removed by dentifrice formulations such as toothpastes and mouth rinses used in routine daily oral hygiene practice. Thus, a crucial unmet need exists for a product for regular home use that will reduce and remove dental calculus.

SUMMARY

Among the various aspects of the present disclosure are a first dental composition comprising or consisting essentially of at least two calculus targeting enzymes.

In one aspect the current disclosure encompasses a dental composition comprising a DNase, chymotrypsin or a functional variant or derivative thereof, and an orally acceptable additive, carrier or excipient or any combination thereof. In some aspects, the dental composition may include β-galactosidase. In some aspects, the dental composition may not include β-galactosidase.

In some aspects, the dental composition may include DNAse in an amount of about 50,000 to about 250,000, or about 100,000 to about 200,000, or about 150,000 to about 200,000, or 150,000, or 160,000, or 170,000, or 180,000, or 185,000 or 190,000, or 200,000 Kunitz/mL.

In some aspects, the dental composition may also include a DNAse, wherein the DNAse is DNAse I or a functional variant or derivative thereof.

In some aspects, the dental composition may also include chymotrypsin or a functional variant or derivative thereof wherein the chymotrypsin or a functional variant or derivative is present in an amount of about 100 to about 5,000, or about 500 to about 4,000, or about 1000 to about 3000, or 1,500, or 1,600, or 1,700, or 1,800, or 1,900, or 2,000, or 2,100, or 2,200, or 2,300, or 2,400, or 2,500, or 2,600, or 2,700, or 2,800, or 2,900 or 3,000 Kunitz/mL.

In some aspects, the dental composition may also include an orally acceptable additive where the orally acceptable additive is a thickener and/or a gelling agent selected from gellan gum (low acyl or high acyl), glycerol, silica, guar gum, xanthan gum, polyethylene glycols, polyvinyl pyrrolidones and co-polymers thereof, polylactic acids, polyglycolic acids, long chain fatty acid alcohols, cellulose-based polymers, acrylate polymers and any combination thereof.

In some aspects, the dental composition may also include orally acceptable carriers for example ethanol, isopropanol, glycerol, sorbitol or any combination thereof.

In some aspects, the dental composition may further include a surfactant for example a ceteareth or a steareth.

In some aspects, the dental composition includes DNase 1 or a functional variant or derivative thereof, chymotrypsin or a functional variant or derivative thereof, and one or more of, 10-20% glycerol, 0.00001-0.000001% Ceteareth-25, 0.1%-0.5% Xanthan gum, 1-10% sorbitol, and 5-25% silica. The composition may further include water.

In some aspects, the dental composition is in the form of a paste or gel, for example a toothpaste or dentifrice, or toothpowder, or mouth wash. In some aspects, the dental composition is combined with a dental tray, a capsule applicator, an oral pick or a dental floss to provide an oral hygiene device.

In some aspects, the current disclosure also encompasses use of the dental composition or device comprising the dental composition, for removing calculus dentalis in a subject in need thereof. In some aspects, the subject is a mammal. In some aspects, the subject is a human.

In one aspect, the present disclosure provides a method for reducing or removing calculus dentalis in a subject in need thereof. The method includes contacting a tooth surface with an effective amount of a dental composition which includes DNAse I or a functional variant or derivatives thereof, and chymotrypsin or a functional variant or derivative thereof.

In some aspects, the dental composition does not comprise β-galactosidase.

In some aspects, the composition further includes an orally acceptable additive, carrier or excipient or a combination thereof.

In some aspects, the composition includes a paste or a liquid and contacting a tooth surface includes application of the composition using a brush, a tray, by oral rinse or any combination thereof.

The method may also include where the method includes at least once daily, at least twice daily or at least three-times daily applications for a period of at least a week.

In some aspects, the disclosure provides a method for reducing or removing calculus dentalis in a subject in need thereof, where the method includes contacting a tooth surface with an effective amount of dental composition.

In some aspects, the subject is a mammal. In some aspects the subject is a canine, equine, feline or primate. In some aspects, the subject is a human.

In some aspects the current disclosure also encompasses a kit, wherein the kit includes the dental composition and instructions for use. The kit may further include at least one applicator selected from a toothbrush, an oral pick, a dental floss, and a dental tray.

Other aspects and features of the disclosure are detailed below.

DETAILED DESCRIPTION

Figure 1:
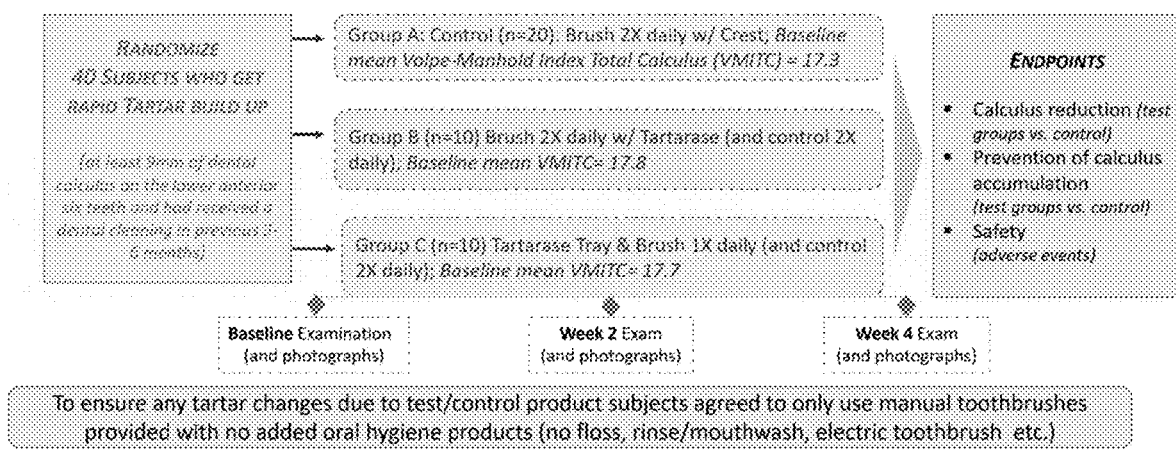
FIG. 1 is a schematic of the proof-of-concept in vivo study design. Randomized trial to evaluate the safety and efficacy of the exemplary formulations to remove existing calculus deposits over a 4-week trial period FIG. 2 provides an overview of the scores associated with the Volpe-Manhold Index. Scores are based on cumulative calculus score, sum of lingual (side toward tongue) surfaces of the 6 lower anterior (Front) teeth.

The present disclosure provides new dental compositions and formulations for reducing or removing dental calculus, methods of their use to reduce or remove dental calculus, and kits comprising the compositions and formulations in humans and non-human animals, including but not limited to dogs and cats.

Definitions

Unless defined otherwise, all technical and scientific terms used herein have the meaning commonly understood by a person skilled in the art to which this invention belongs. The following references provide one of skill with a general definition of many of the terms used in this invention: Singleton et al., Dictionary of Microbiology and Molecular Biology (2nd Ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them unless specified otherwise.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data is provided in a number of different formats, and that this data, represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

As used herein, the terms "optional" or "optionally" mean that the subsequently described event or circumstance may or may not occur, and that the description includes instances where said event or circumstance occurs and instances where it does not.

The term "calculus targeting enzyme" as used herein refers to: (i) an enzyme that hydrolyze(s) the sugar-phosphate ester linkages of deoxyribonucleic acid (DNA); (ii) an enzyme that hydrolyzes glycoprotein carbohydrate at linkages containing galactose, N-acetyl-glucosamine, fucose, N-acetyl-galactosamine, or sialic acid; and/or (iii) a proteolytic enzyme that hydrolyzes amino acid linkages in protein backbone. Calculus targeting enzymes include but are not limited to DNase, proteolytic enzymes like chymotrypsin, proteinase K, trypsin and beta-galactosidase and any combination thereof. others as The terms "polypeptide" and "protein," as used interchangeably herein, refer to polymers of amino acids of any length. The polymer may be linear or branched, it may comprise modified amino acids, and it may be interrupted by non-amino acids. The terms also encompass an amino acid polymer that has been modified naturally or by intervention; for example, disulfide bond formation, glycosylation, lipidation, acetylation, phosphorylation or any other manipulation or modification, such as conjugation with a labeling component. Also included within the definition are, for example, polypeptides containing one or more analogs of an amino acid (including, for example, unnatural amino acids, etc.), as well as other modifications known in the art. For example, as used herein the protein or polypeptide sequence of an enzyme (for example, DNAseI, Chymotrypsin) also encompasses modifications as provided herein, derivatives and variants of the polypeptide.

The terms "derivative" or "variant," when used herein with reference to a polypeptide, refers to a polypeptide related to a wild-type polypeptide, for example either by amino acid sequence, structure (e.g., secondary and/or tertiary), activity (e.g., enzymatic activity) and/or function. Derivatives, or variants of a polypeptide can comprise one or more amino acid variations (e.g., mutations, insertions, and deletions), truncations, modifications, or combinations thereof compared to a wild-type polypeptide. The term "functional variant or derivative" as used herein encompasses a protein that functions at the same level, or has enhanced or reduced functionality as compared to its wild-type polypeptide.

As used herein, the term "comprising" is to be understood as encompassing both "including" and "consisting of", with both meanings specifically intended, and thus the corresponding individually disclosed aspects consistent with the present disclosure.

As used herein, "and/or" should be understood as specifically disclosing each of the two specified features or components with, or without the other. For example, "A and/or B" is to be taken as specific disclosure of each of (i) A, (ii) B and (iii) A and B, the same as if each were set out individually herein.

As various changes could be made in the above-described cells and methods without departing from the scope of the invention, it is intended that all matter contained in the above description and in the examples given below, shall be interpreted as illustrative and not in a limiting sense.

(I) Dental Calculus

Calculus has a complex composition and will vary between different individuals, dependent on diet, genetics (subtle compositional variations in saliva) and the makeup of the oral microbiome, but the mechanism of its deposition remains to be determined. In a recent report (Aghanashini, S., et al., J. of Health Sciences and Res. (2016) 7:42-50) six theories of calculus formation were reviewed: the Booster Mechanism; the Epitactic concept; the Inhibition theory; the Transformation theory; the Bacterial Theory; and the Enzymatic theory. All but the Bacterial theory focus on inorganic components. The Bacterial theory hypothesizes that bacteria attaching to the tooth surface is responsible for calculus formation. Studies from the United States in the 1960s and 1970s focused on the composition of calculus hydrolysates and did not venture to identify the macromolecular organic components, if any. Since then, further progress in the U.S. has not been forthcoming. Thus, the field has not consolidated around a single view of calculus development.

Recent studies of dental calculus harvested from ancient teeth have assessed for the presence of DNA, and demonstrated that DNA is an extremely rugged molecule. But, in addition to DNA, calculus contains salivary glycoproteins, mucin being the most abundant member. An additional component of calculus formation is the protein meshwork created by the activity of transglutaminase, which crosslinks glutamine residues on one protein with a lysine residue on an adjacent protein molecule. This process is thought to originate at the tooth gingival interface, where surface proteins on the epithelial surface become crosslinked to soluble salivary proteins creating a meshwork that extends from the epithelium to the enamel surface. Thus, at the tooth/gingival interface, proteins on the epithelial surfaces become cross-linked to other salivary and food proteins by the enzyme transglutaminase, creating an additional foundational material for mineralization.

The model informing the present disclosure begins with chemically-clean tooth enamel in the normal oral environment. Without intending to be bound by theory, it is believed that mucin will bind to positively charged calcium ions in the outer surface of the enamel hydroxyapatite ($Ca_{10}(PO_4)_6(OH)_2$), and that salivary calcium will further bind to the outer face of the enamel-associated mucins, initiating a laminated arrangement. It is further believed that the less abundant but much larger DNA from the oral environment will associate with available hydroxyapatite calcium and with the calcium bound to the outer face of the immobilized mucins. DNA and mucin can be approximated as cylindrical structures with the charged groups arrayed radially. Therefore, only a fraction of the charged groups will occupy a face of the molecule that is interacting with the underlying matrix (¼-5 in the case of DNA). Thus, the effectiveness of cooperative interactions relies upon the molecular length to supply the strength needed to make the interaction of sufficient duration in a highly hydrated environment. By reducing the length of the DNA polymer or cleaving the carbohydrate chains, terminating in negative charges, from the glycoprotein peptide backbone, the strength of the cooperative interactions is reduced. With progressive reduction of DNA polymer length and increased cleavage of carbohydrate chains from glycoprotein peptide backbones, the cooperativity integral to calculus and plaque structure is lost, allowing the constituents to be washed away.

DNA is recognized as highly resistant to cleavage. Chemical hydrolysis of DNA requires boiling it in acid. The relationship of the length of DNA, relative to a bacterial cell, is on a macro-scale, but the role of DNA and mucin in the formation of plaque and calculus is on the molecular-scale. The number of associative events that mucin and DNA can achieve are enormous, contributing to the strength of the calculus aggregate. Thus, DNA's extensive length and chemical imperviousness makes it a strategic component of calculus. While mucin is not as rugged as DNA, it is sufficiently sturdy to play an important structural role. Both mucin's and DNA's association with immobilized Calcium is enhanced through cooperativity. In this context, cooperativity is like the base pairing of double stranded DNA. While the DNA base pair interactions are established by hydrogen bonding (weak, compared with ionic salt bridges that will dominate in calculus) the precise geometry of the double helix, and the large number of base pairs makes separating the two strands difficult enough to require temperatures approaching boiling. In the case of calculus formation, when one salt bridge comes undone, through competition with water, those remaining upstream and downstream salt bridges will retain the two undone bridge partners in close enough proximity to facilitate their rapid re-association.

A purely chemical approach to the removal of calculus would require a chemical environment that would be chemically extreme, resulting in damage to the oral cavity. However, a biologic/enzymatic approach would be a non-toxic, effective and an efficient approach to disintegrating dental calculus. DNA can be cleaved by the enzyme deoxyribonuclease (DNase) anywhere along its length, at accessible sugar-phosphate bonds, reducing the length of the DNA polymer to short stretches of DNA (oligonucleotides) with the proportional loss of cooperativity. The element of the mucin glycoprotein that forms the associations with calcium are the sulfate and sialic acid groups (both negatively charged) at the ends of the carbohydrate chains. The carbohydrate chains of salivary mucin are diverse and large. They terminate in neutral sugars (56%), sialic acid (26%) and sulfate (19%) and vary in average chain lengths of 13 units, 17 units and 41 units, respectively (Thomsson, K. A., Glycobiology (2002) 12: 1-14). The carbohydrate chains are composed predominantly of galactose, fucose, and N-acetyl-glucosamine with lesser quantities of N-acetyl galactose. The mucin glycoproteins dimerize end-to-end and then go on to form higher-order structures. The microbes of the oral and gut microbiome have evolved to exploit the mucin carbohydrates as a nutrient source. They secrete N-acetyl-glucosaminidase, beta-galactosidase, N-acetyl-galactosidase, fucosidase, neuraminidase (sialidase) to cleave the carbohydrate chains into smaller sizes for nutrient uptake (Derrien, M., Gut Microbes (2010) 1:254-268). While the most accessible region to cleave the carbohydrate chain is in the middle of the chain at the galactose and N-acetyl-glucosamine residues with the enzymes beta-D-galactosidase and beta-N-acetyl-D-glucosaminidase, respectively, any cleavage that removes the acidic sulfates and sialic acid units from the protein chain will eliminate the cooperativity, important in the calculus and plaque architecture.

Additionally, or alternatively, an enzyme that targets the polypeptide component of these glycoproteins (for example, chymotrypsin) was surprisingly also found to be effective in enhancing breakdown of calculus and plaque architecture.

All of these enzymes are widely expressed by organisms in nature, where they cleave their polymer substrates into components that are readily utilized for the organism's nutrient requirements. Some of these organisms have evolved to successfully occupy and exploit extreme environments, such as hot springs. The evolution will have involved altering enzyme sequences to maintain their three-dimensional architecture and activities in high temperature environments. This will provide these enzymes with greater thermal stability and longer shelf life.

(II) Dental Compositions and Formulations

Compositions and formulations according to the present disclosure comprise at least two calculus targeting enzyme, and may include a combination of two or more calculus targeting enzymes each with different catalytic activities that hydrolyze different chemical constituents in the structure of calculus. Calculus targeting enzymes include enzymes that hydrolyze any one of: (i) the sugar-phosphate ester linkages of deoxyribonucleic acid (DNA); (ii) glycoprotein carbohydrate at linkages containing galactose; (iii) glycoprotein carbohydrate at linkages containing N-acetyl-glucosamine; (iii) glycoprotein carbohydrate at linkages containing fucose; and (iv) glycoprotein carbohydrate at linkages containing sialic acid (v) protease targeting peptide bonds in a glycoprotein. The calculus targeting enzymes, DNases protease and optionally carbohydrate chain-cleaving enzymes, act upon the DNA and glycoprotein elements that are readily accessible at the surface of dental plaque and calculus. As the surface-accessible DNA is cleaved by DNase into shorter segments, for example, the shorter segments will have lost their capacity for cooperative associations with the underlying matrix, allowing water to displace the cleaved DNA and proteins. Similarly, when surface-accessible glycoprotein carbohydrate chains are cleaved, by beta-galactosidase, for example, the underlying sialic acid/sulfate-calcium association becomes singular, i.e., is no longer connected to the protein backbone, and no longer a component of a cooperative structure and is effectively displaced by the abundant water. However, surprisingly this function can also be served by the presence of proteases that perform proteolysis and facilitate breakdown of glycoproteins, thus forgoing the need for beta-galactosidase. As the surface-accessible DNA and glycoproteins are cleaved and displaced, the DNA and glycoproteins that were beneath the now displaced cleaved DNA and glycoproteins are accessible to the DNase and carbohydrate chain or protein-cleaving enzymes that repeat with progressive cycles of cleavage and displacement, thereby disintegrating the three-dimensional plaque and calculus structure, and thus disintegrating the plaque and calculus.

Thus, in one aspect a dental composition according to the present disclosure comprises at least two calculus targeting enzymes selected from an enzyme or other biocatalyst having a catalytic activity that hydrolyzes the phosphate ester bonds in deoxyribonucleic acid (DNA), an enzyme or other biocatalyst having a catalytic activity that hydrolyzes glycoprotein carbohydrate polymers at galactose sugars, or an enzyme that hydrolyzes peptide bonds and any combination thereof. In some aspects, the enzyme that hydrolyzes peptide bonds is chymotrypsin or a functional variant or derivative thereof.

In a composition as disclosed, at least one calculus targeting enzyme or other biocatalyst can be a DNase having a catalytic activity that hydrolyzes the phosphate ester bonds in deoxyribonucleic acid (DNA). In one aspect, the at least one calculus targeting enzyme is a DNase. The amount of DNase can be varied in amount from about 50,000 Kunitz units/mL to about 800,000 Kunitz units/mL. In different examples, DNase is present in an amount of about 100,000 Kunitz units/mL, about 200,000 Kunitz units/mL, about 300,000 Kunitz units/mL, about 400,000 Kunitz units/mL, about 500,000 Kunitz units/mL, about 600,000 Kunitz units/mL, about 700,000 Kunitz units/mL, or about 750,000 Kunitz units/mL.

In some aspects, DNase from any suitable source organism can be used. In some aspect, the DNase can be from a recombinant source. In some aspects the DNase can be synthetic. A non-limiting example of DNase is Bovine pancreatic deoxyribonuclease (i.e., "Deoxyribonuclease I") (SEQ ID NOS. 1) or a functional variant or derivative thereof. In some aspects the DNase comprises a polypeptide sequence at least about 60% to about 75%, or about 75% to about 80%, or about 80% to about 85%, or about 85% to about 90%, or about 90% to about 95%, or about 95% to about 100% identical to SEQ ID. NO: 1. In some aspects, the polypeptide is at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% identical to SEQ ID NO. 1.

In another aspect, the composition further comprises a protease, for example chymotrypsin. Chymotrypsin also referred to as EC 3.4.21.1, chymotrypsins A and B, alpha-chymar ophth, avazyme, chymar, chymotest, enzeon, quimar, quimotrase, alpha-chymar, alpha-chymotrypsin A, alpha-chymotrypsin is a serine protease produced by the pancreas that hydrolyzes the peptide bonds of tryptophan, leucine, tyrosine, and phenylalanine. Chymotrypsin preferentially cleaves peptide amide bonds where the side chain of the amino acid N-terminal to the scissile amide bond (the Pi position) is a large hydrophobic amino acid (tyrosine, tryptophan, and phenylalanine). These amino acids contain an aromatic ring in their side chain that fits into a hydrophobic pocket (the Si position) of the enzyme. Chymotrypsin also hydrolyzes other amide bonds in peptides at slower rates, particularly those containing leucine and methionine at the Pi position.

Chymotrypsin, in the body is produced as an inactive precursor chymotrypsinogen (for example, bovine chymotrypsinogen, SEQ ID NOS. 2). It is activated into its active form by another enzyme called trypsin. This active form is called π-chymotrypsin and is used to create α-chymotrypsin. Trypsin cleaves the peptide bond in chymotrypsinogen between arginine-15 and isoleucine-16. This creates two peptides within the π-chymotrypsin molecule, held together by a disulfide bond. One of the π-chymotrypsins acts on another by breaking a leucine and serine peptide bond. The activated π-chymotrypsin reacts with other π-chymotrypsin molecules to cleave out two dipeptides, which are, serine-14-arginine-15 and threonine-147-asparagine-148. This reaction yields the α-chymotrypsin comprising sequences chymotrypsin A, chymotrypsin B and chymotrypsin C (SEQ ID NOS. 3, 4, 5 respectively), that are linked via disulfide bonds to form active α-chymotrypsin.

In some aspects, chymotrypsin from any suitable source organism can be used. In some aspect, the chymotrypsin can be from a recombinant source. In some aspects the chymotrypsin can be synthetic. In some aspects, the composition comprises a polypeptide comprising one or more of SEQ ID NOS. 3, 4 or 5 or variants or derivatives thereof. In some aspect, the chymotrypsin is a recombinant chymotrypsin, which has been optimized for commercial production or commercial use. In some aspects, the recombinant chymotrypsin is optimized for use in dental products. In some aspects the composition comprises a polypeptide sequence at least about 60% to about 75%, or about 75% to about 80%, or about 80% to about 85%, or about 85% to about 90%, or about 90% to about 95%, or about 95% to about 100% identical to one or more of SEQ ID. NOS: 3-5. In some aspects, the composition comprises a polypeptide that is at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% identical to any one of SEQ ID NOS 3-5.

In some aspects, the amount of chymotrypsin is present in functional units based on the rate of hydrolysis of a chromogenic substrate in an amount of about 100 to about 5,000, or about 500 to about 4,000, or about 1000 to about 3000, or 1,500, or 1,600, or 1,700, or 1,800, or 1,900, or 2,000, or 2,100, or 2,200, or 2,300, or 2,400, or 2,500, or 2,600, or 2,700, or 2,800, or 2,900 or 3,000 units/mL.

In some aspects, the dental composition may comprise additional proteolytic enzymes. Non-limiting example of proteolytic enzymes include Aminopeptidase M, Bromelain, Carboxypeptidase A, Carboxypeptidase B, Carboxypeptidase Y, Cathepsin C, Chymotrypsin, Collagenase, Dispase, Endoproteinase Arg-C, Endoproteinase Asp-N, Endoproteinase Glu-C, Endoproteinase Lys-C, Enterokinase, Factor Xa, Ficin, Kallikrein, Papain, Pepsin, Plasmin, Pronase, Proteinase K, Subtilisin, Thermolysin, Thrombin or Trypsin.

In another aspect, at least one calculus targeting enzyme in a composition is a beta-galactosidase having a catalytic activity that hydrolyzes glycoprotein carbohydrate polymers at galactose sugars. In some aspects, beta-galactosidase from any source organism can be used. In some aspects, the beta-galactosidase is from a recombinant source. In some aspects the composition comprises the enzyme beta-galactosidase comprising a polypeptide sequence at least about 60% to about 75%, or about 75% to about 80%, or about 80% to about 85%, or about 85% to about 90%, or about 90% to about 95%, or about 95% to about 100% identical to SEQ ID. NOS: 6. In some aspects, the composition comprises a polypeptide that is at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% identical to SEQ ID NO: 6.

The amount of beta-galactosidase can vary from about 500 Kunitz units/mL to about 20,000 Kunitz units/mL. In one example, beta-galactosidase is present in an amount of about 8,000 Kunitz units/mL. In other examples, beta-galactosidase is present in an amount of about 1,000 Kunitz units/mL, about 2,000 Kunitz units/mL, about 3,000 Kunitz units/mL, about 4,000 Kunitz units/mL, about 5,000 Kunitz units/mL, about 6,000 Kunitz units/mL, about 7,000 Kunitz units/mL, about 9,000 Kunitz units/mL, or about 10,000 Kunitz units/mL. As detailed further below, a composition may include any one or more proteolytic enzymes. The amount of a proteolytic enzyme, such as but not limited to proteinase K or chymotrypsin, can vary from about 500 Kunitz units/mL to about 10,000 Kunitz units/mL. In different examples, a proteolytic enzyme is present in an amount of about 1,000 Kunitz units/mL, about 2,000 Kunitz units/mL, about 3,000 Kunitz units/mL, about 4,000 Kunitz units/mL, about 5,000 Kunitz units/mL, about 6,000 Kunitz units/mL, about 7,000 Kunitz units/mL, about 8,000 Kunitz units/mL, or about 9,000 Kunitz units/mL.

Units of an enzyme as disclosed herein should be understood according to customary usage in the field for each enzyme. For example, for DNase, 1 unit is defined as the amount of enzyme required to produce an increase in absorbance at 260 nm of 0.001/min/mL at 25° C. of highly polymerized DNA, under conditions of HCl, pH 7.5, 50 mM $MgCl_2$, 13 mM $CaCl_2$). For Beta-Galactosidase, 1 unit is the amount of enzyme required to hydrolyze 1.0 micromole of o-nitrophenyl Beta-D-galactoside to o-nitrophenyl and D-galactose per minute at pH 7.3 at 37° C., 410 nm. For chymotrypsin, 1 unit is the amount of enzyme required to hydrolyze 1 micromole of N-benzoyl-L-tyrosine ethyl ester per minute at pH 7.8 at 25° C. For Proteinase K, 1 unit is the amount of enzyme required to digest urea-denatured hemoglobin at pH 7.5, 37° C., per minute, to produce absorbance equal to that of 1.0 μmol of L-tyrosine using Folin & Ciocalteu's phenol reagent (6). (See, e.g., www.worthington-biochem.com/PROK/cat.html). Those of skill in the art will appreciate how to define a unit for other proteolytic enzymes. In the examples below, the enzymes amylase and DNase-free RNase are used as controls.

A dental composition according to the present disclosure may comprise any one or more enzymes or other biocatalysts having a catalytic activity that hydrolyzes glycoprotein carbohydrate polymers at any one or more of the following: i) at N-acetyl-glucosamine sugars; (ii) at fucose sugars; (iii) at neuraminic acid (sialic acid) sugars. Any one or more enzymes of (i), (ii) or (iii) can be combined in a composition with a DNase and/or beta-galactosidase as detailed above. Thus, in various aspects, a dental composition according to the disclosure may comprise any combination of two or more enzymes disclosed herein. Non-limiting examples of such enzymes are N-acetyl-glucosaminidase, N-acetyl-galactosidase, fucosidase, and neuraminidase (sialidase), each capable of cleaving the carbohydrate chains. The most accessible region for cleaving the carbohydrate chain is in the middle of the chain at the galactose and N-acetyl-glucosamine residues, using the enzymes beta-D-galactosidase and beta-N-acetyl-D-glucosaminidase.

Stable enzymes for preparing the dental compositions and formulations can be readily obtained as a purified, lyophilized powder from a commercial enzyme supplier such as Worthington Biochemical Corp. (Lakewood, NJ). Enzymes may be sourced from animal tissue such as animal (e.g., bovine) pancreas, or produced using recombinant methods. The lyophilized powder is dissolved in an aqueous solvent, which may be water. Sufficient solvent is added to the commercially supplied vial of lyophilized powder, to fill the vial about halfway, and the remainder of the vial filled with glycerol to produce a reasonably shelf stable 50/50, water/glycerol solution. The solution can be maintained as such in a refrigerator for at least a few weeks. A plastic or glass pipette or another instrument is used to extract about 50 μl to about 200 µl of each enzyme solution. The enzyme or other biocatalyst solution, or combination of enzyme or other biocatalyst solutions, or a composition or formulation comprising the enzymes is then applied to the teeth using any of a variety of known oral application methods or tools, with particular attention paid to the gingival border. For example, the enzyme solution(s) or a composition or formulation containing one or more enzymes can be applied to a toothbrush, or preferably to a smaller interdental pick with a brush. Alternatively, multiple enzymes can be prepared as described, and then combined in a single solution and then applied to the applicator brush, or each enzyme solution can be applied separately to the brush. Alternatively, a composition or formulation comprising one or more enzymes can be prepared as described, and then applied to the applicator brush. The brush is used to apply the enzyme solution to the tooth surfaces, with particular attention paid to the gingival border where calculus tends to form.

Any one or more calculus targeting enzymes can be prepared as a simple solution as detailed above, or combined with orally acceptable additives, carriers or excipients to prepare a liquid, paste or gel form that helps maintain contact of the enzyme(s) with the tooth surface for a more extended period than a liquid allows. Enzyme solutions as disclosed herein can be combined with or added to a mouthwash or toothpaste composition as known in the art. Non-limiting examples of orally acceptable additives, carriers or excipients are generally as known in the art and include thickeners or gelling agents, binders, stabilizers, preservatives, flavorings, fluoride salts, surfactants, abrasives, tartar control agents, calcium sequestrants, and colorings. Additives such as flavorings and colorings can be generally as known in the art and readily commercially available.

Non-limiting examples of binders include carboxyvinyl polymers (such as polyacrylic acids cross-linked with polyallyl sucrose or polyallyl pentaerythritol), hydroxyethyl cellulose, hydroxypropyl cellulose, water soluble salts of cellulose ethers (such as sodium carboxymethyl cellulose and sodium carboxymethyl hydroxyethyl cellulose), natural gums (such as carrageenan, gum karaya, guar gum, xanthan gum, gum arabic, and gum tragacanth).

Non-limiting examples of thickeners and gelling agents are gellan gum (low acyl or high acyl), glycerol, silica, guar gum, xanthan gum, polyethylene glycols, polyvinyl pyrrolidones and co-polymers thereof, polylactic acids, polyglyocolic acids, long chain fatty acid alcohols, cellulose-based polymers and acrylate polymers.

Non-limiting examples of carriers are orally acceptable alcohols such as ethanol, isopropanol and glycerol. Non-limiting examples of tartar control agents are generally as known used in readily commercially available dentifrice products, such as pyrophosphates and their salts, polyphosphates, polyphosphonates and mixtures thereof. Pyrophosphate salts include dialkali and tetra-alkali metal pyrophosphate salts and mixtures thereof. Non-limiting examples of antiseptics and preservatives are quaternary ammonium salts, polymers thereof, chlorhexidine and salts thereof, polyhexamethylene biguanide, octenidine, organic acids, chelating agents for example a calcium chelating agent (e.g., Ethylenediaminetetraacetic acid (EDTA)), essential oils, and parabens. Non-limiting examples of antibiotics are penicillin and tetracyclin. Non-limiting examples of orally acceptable abrasives are silica or other inorganic particles, synthetic polymer particles, or organic particles such as plant-derived particles.

Any orally acceptable surfactant, most of which are anionic, nonionic or amphoteric can be used. In some aspects, the surfactant choice and amount is such that it does not interfere with enzyme activity. Non-limiting examples of nonionic surfactants include ceterareth, steareth, polyethoxylated fatty acid sorbitan esters, ethoxylated fatty acids, esters of polyethylene glycol, ethoxylates of fatty acid monoglycerides and diglycerides, and ethylene oxide/propylene oxide block polymers. In some aspects, the surfactant is selected from polyethylene glycol ethers of fatty alcohols in particular polyethylene glycol ethers having from 20 to 40 ethylene oxide groups per unit. In some exemplary aspects the surfactant is Ceteareth-25 or Steareth-30. One or more surfactants are optionally present in a total amount of about 0.000001% to about 5% depending on the type of formulation and surfactant used. In some aspects, the surfactant amount is about 0.000001% to about 0.00001%, or about 0.00001% to about 0.0001%, or about 0.0001% to about 0.001%, or about 0.001% to about 0.01%, or about 0.01% to about 1%, or about 1% to about 5% by weight of the composition.

In some aspects, the dental composition or formulation further comprises water and/or polyhydric alcohol. Typical polyhydric alcohols for use in the oral care composition, particularly a dentifrice or toothpaste composition include humectants such as glycerol, sorbitol, polyethylene glycol, polypropylene glycol, propylene glycol, xylitol (and other edible polyhydric alcohols), hydrogenated partially hydrolyzed polysaccharides and mixtures thereof. In some aspects the polyhydric alcohol is glycerol and/or sorbitol. In some aspects, the amount of water and/or polyhydric alcohol depends on the nature of the formulation. In some exemplary aspects, the amount of water and/or polyhydric alcohol will be at least 10 wt %, or at least 20 wt %, or at least 30 wt %, or at least 40 wt % percent, or at least 50 wt %, or at least 60 wt %, or at least 70 wt %, or at least 80 wt % based on the total weight of the composition. In some aspects, the level of water and/or polyhydric alcohol will be less than 95 wt % of the total composition, or less than 90 wt %, or less than 85 wt % or less than 80 wt %.

In some aspects, the formulations provided herein can be in the form of a dentifrice for example toothpaste or toothpowder, mouthwashes, mouth sprays or liquid formulations. In some aspects, the formulation is a dentifrice. The term "dentifrice" generally denotes formulations which are used to clean the surfaces of the oral cavity. The dentifrice is an oral composition that is not intentionally swallowed for purposes of systemic administration of therapeutic agents, but is applied to the oral cavity, used to treat the oral cavity and then expectorated. In some aspects, the dentifrice is used in conjunction with a cleaning implement such as a toothbrush, usually by applying it to the bristles of the toothbrush and then brushing the accessible surfaces of the oral cavity. In some aspects, the dentifrice is in the form of a paste or a gel (or a combination thereof).

A dentifrice composition according to the invention will usually contain, as the aqueous continuous phase, a mixture of water and polyhydric alcohol in various relative amounts, with the amount of water generally ranging from 10 to 50% by weight (based on the total weight of the dentifrice) and the amount of polyhydric alcohol generally ranging from 20 to 60% by weight (based on the total weight of the dentifrice).

The oral care composition, in particular toothpaste or dentifrice compositions may further comprise additional abrasive materials. In some aspects, abrasive materials may be present in an amount of from 0.5 to 75%, 3 to 60% by weight based on the total weight of the paste. Suitable abrasive cleaning agents include silica xerogels, hydrogels and aerogels and precipitated particulate silicas; calcium carbonate, dicalcium phosphate, tricalcium phosphate, calcined alumina, sodium and potassium metaphosphate, sodium and potassium pyrophosphates, sodium tri-metaphosphate, sodium hexametaphosphate, particulate hydroxyapatite and mixtures thereof. In some aspects the abrasive material is silica, present in an amount of at least 10% to 15%, or 15% to 20% or 20% to 25%, or 25% to 30% or 30% to 35%, or 35% to 40%, or 40% to 45%, or 45% to 50%, or 50% to 55%, or 55% to 60%, or 60% to 70% or 70% to 80% by weight.

In some aspects, the compositions of the invention may comprise a zinc ion. Preferably the sources of zinc ions are zinc chloride, zinc acetate, zinc gluconate, zinc sulphate, zinc fluoride, zinc citrate, zinc lactate, zinc oxide, zinc monoglycerolate, zinc tartrate, zinc pyrophosphate zinc maleate and mixtures thereof.

In some aspects, the compositions of the present invention may also contain further optional ingredients customary in the art such as fluoride ion sources, buffers, flavoring agents, sweetening agents, coloring agents, opacifying agents, preservatives, ant sensitivity agents, bleaching and antimicrobial agents.

In some aspects the dental composition or formulation is combined with a dental tray, a capsule applicator, an oral pick or a dental floss.

(II) Methods of Removing Dental Calculus

The present disclosure encompasses methods for reducing or removing dental calculus from a tooth surface in a subject in need thereof. In some aspects, the subject is a human or a non-human animal, including but not limited to feline, canine, bovine, equine or primates. A method for reducing or removing calculus dentalis comprises for example contacting a tooth surface of a subject, with an effective amount of at least two calculus targeting enzyme as disclosed herein. The contacting may be for example by applying a solution (e.g., an aqueous solution), a dentifrice or a dental composition or dental formulation as disclosed herein to the tooth surface, waiting for a period of time and then rinsing the mouth out, typically with water. It will be appreciated that the amount of time can vary depending on a range of factors including the degree and severity of the calculus build-up, the individual being treated, whether the treatment is taking place in a professional office by a dental professional or at home, and other factors. For example, the solution can be applied to the tooth surface for a period of less than about 60 minutes, less than about 30 minutes, less than about 15 minutes, less than about 15 minutes, less than less than about 10 minutes, less than about 5 minutes, less than about 2 minutes, less than about 1 minute, or about 30 seconds.

The contacting may be performed on a repeated and/or regular basis, such as once or twice or more often on a daily basis, once every two days once every three days, once every four days, once every five days, once every six days, once weekly, once biweekly, once every three weeks, or once monthly, or once or twice annually at approximately regular spaced intervals. Further, the contacting may be before, during/in combination with, or after, contacting or treatment with an oral care agent such as a toothpaste or mouth rinse. Following the contacting with an enzyme or other biocatalyst solution or composition, disintegrated or loosened calculus can be further removed from the tooth surface and oral cavity by rinsing with water or another agent, manual scaling or scraping, brushing, and/or swabbing. In some aspects, the method can comprise use of the dental composition provided herein along with additional dental treatment, routines and/or procedures.

(III) Kits

A further aspect of the present disclosure provides kits comprising an amount of any of the disclosed dental compositions or formulations, or any combination thereof, as detailed above. A kit optionally includes one or more brushes, dental picks, dental trays and/or applicators for applying any of the enzyme solutions, compositions or formulations to teeth, and then removing disintegrated calculus from the tooth surfaces. Kit components can be provided in suitable containers along with other kit components such as any commercially available containers or packaging and the like. The kits provided herein generally include instructions for carrying out the methods detailed herein. Instructions included in the kits may be affixed to packaging material or may be included as a package insert. While the instructions are typically written or printed materials, they are not limited to such. Any medium capable of storing such instructions and communicating them to an end user is contemplated by this disclosure. Such media include, but are not limited to, electronic storage media (e.g., magnetic discs, tapes, cartridges, chips), optical media (e.g., CD ROM), and the like. As used herein, the term "instructions" can include the address of an internet site that provides the instructions.

Without intending to be bound by theory, it is believed that the present compositions and methods are so effective in breaking up and removing calculus in part because of the way in which calculus builds up and is structured. The inventor's work indicates that dental plaque has a layered structure including an internal gel or gel-like structure over which is layered one or more layers of calcium cross-bridged extracellular DNA (eDNA) and proteins in cross-linked meshwork. The internal gel or gel-like portion comprises aqueous contents similar to the contents of the salivary glands. The aqueous contents can include inorganic substances, calcium, phosphate, hydroxyapatite, proteins and glycoproteins, amylase, polyproline proteins, and mucins. Additionally, the dental plaque can comprise contents that come from non-salivary gland sources, including transglutaminase from the oral epithelial surface, and stratum corneum chymotryptic enzyme from the soft palette. Dental plaque can further include contents from non-host sources, such as bacterial cells from the oral microbiome, eDNA secreted from the microbiome, and the protein and polysaccharides from food. The outermost layers of the plaque comprise calcium cross-bridged eDNA (about 0.01%), and proteins (about 0.04%-0.05%), wherein the proteins include cross-linked meshwork of negatively charged mucin glycoproteins and transglutaminase.

Additionally, the inventor has further identified that the process of calcification of plaque can begin immediately, with the plaque becoming about 50% calcified within 2 days, to 60-90% in about 12 days. This process of calcification is also progressive, by which successive layers are added and thereby build the calculus structure from a more 2-dimensional to a more 3-dimensional structure. While the meshwork of calcium cross-bridged eDNA and mucin glycoprotein is reversible, the meshwork formed by transglutaminase cross-linked protein is irreversible. The compositions and methods of the present disclosure have been developed to effectively target the contents that form the structure of calculi and process of its formation, to help treat or prevent calculi, as elaborated in the following examples.

EXAMPLES

Example 1: Analysis of Dental Tartar/Calculus Composition and Structure

Calculus, harvested from teeth using metal alloy dental picks is placed in 0.5 mL of water in 1.5 mL microfuge tubes. The calculus is pulverized using a Teflon pestle fitted to the microfuge tube. The contents are centrifuged, the supernatant aspirated and re-suspended in 1 mL water, and 100 microliter aliquots are drawn and placed in one or more microfuge tubes. The contents of each tube are centrifuged, supernatant aspirated and then re-suspended in 300 microliters of water in a tube containing one of the following:

1. Nothing added (Water control)
2. 1600 units of DNase 1
3. 25 units of beta-galactosidase
4. 25 units of beta-galactosidase and 1600 units of DNase 1
5. 10 units of proteinase K
6. 20 units of amylase (control)
7. 50 units of DNase-free RNase (control)

The contents of each tube are mixed and incubated for 30 minutes at about 37° C. The contents are centrifuged, and the aliquots removed and analyzed for the presence and amount of protein, DNA and calcium. In addition, the products of the DNase treatment are assessed by western blot for mucin. Because of the polymer length, DNA is expected to be the dominant component in the formation and stabilization of calculus. DNA provides a more three-dimensional structure to plaque and calculus because its length allows it to establish a torturous path with periodic bridging with calcium-associated glycoproteins. Transglutaminase crosslinks adjacent proteins, further stabilizing the calculus. Thus, a combination of DNase and beta-galactosidase is an effective calculus-degrading treatment, in that the combination attacks the components with the greatest length. Because both DNase and beta-galactosidase are proteins, a protease can be added either before or after the treatment with DNase and beta galactosidase. Furthermore, because mucin is a major constituent of saliva, spitting saliva out during glycoprotein-hydrolyzing enzyme treatment can increase the treatment efficacy. Table 1 shows results expected when samples are treated as detailed above.

TABLE 1

Percentages of perceived maximum product yields

|  | Protein | DNA | Calcium |
|---|---|---|---|
| Control | 5 | 5 | 5 |
| DNase | 70 | 70 | 70 |
| β-gal | 65 | 65 | 65 |
| β-gal + DNase | 90 | 90 | 90 |
| Prot-K | 40 | 40 | 40 |
| DNase-free RNase control | 10 | 10 | 10 |
| Amylase control | 7 | 7 | 7 |

Example 2: Calculus Targeting Composition

A composition was prepared as follows: DNase 1 and β-galactosidase were each obtained as a purified, lyophilized powder from Worthington Biochemical Corp. (Lakewood, NJ). Each enzyme in powdered form was dissolved in about 2 mL of water in a vial having a volume of about 4 mL, and the remainder of the vial filled with glycerol to produce a reasonably shelf stable 50/50, water/glycerol enzyme solution. The solution was maintained in a refrigerator for about 2-3 weeks. When Subject A was ready to treat for calculus, about 100 μl of the solution was extracted with a plastic pipette, and applied to the brush portion of a commercially available GUM® interdental brush, but could equally well have been applied using a similar tool. Subject A used the brush to apply the enzyme solution once daily to the tooth surfaces, paying particular attention to the gingival border. After allowing a few minutes to elapse, Subject A proceeded to use a regular toothbrush to remove disintegrated calculus from tooth surfaces. Subject A repeated once daily application of the enzyme solution as described above for a period of about 3 weeks and noticed pronounced reduction of calculus and plaque.

Although illustrated as a solution, it should be appreciated that a dental composition could take a variety of other forms, for example, a paste or gel or other suitable vehicle for delivering the enzyme or enzymes to the tooth surface.

Example 3: Dog Calculus Targeting Composition

The following solutions were prepared as follows: DNase 1, β-galactosidase, and proteinase K were each obtained as a purified, lyophilized powder from Worthington Biochemical Corp. (Lakewood, NJ). DNase 1 and β-galactosidase powders were dissolved in about 2 mL of water in a vial having a volume of about 4 mL, and the remainder of the vial filled with glycerol to produce a reasonably shelf stable 50/50, water/glycerol enzyme solution. The solution was maintained in a refrigerator for about 2-3 weeks.

Into a round bottom flask equipped with a magnetic stirring bar, was placed 0.5 g of pulverized dog calculus. Into the flask was added 10000 U of DNase. The contents were warmed to 37° C. and stirred for 10 minutes. The resulting mixture became colloidal. Then, 500 U β-galactosidase was added into the flask maintained at 37° C. This mixture was stirred for an additional 10 minutes. The amount of pulverized dog calculus in the flask was visibly reduced and the amount of colloid increased. 100 ug of Proteinase K was added and stirred for an additional 10 minutes. The amount of the colloidal dispersion increased, and the amount of pulverized dog calculus further reduced by about 70-75%.

Example 4: Anti-Calculus Enzyme Formulations with DNAse 1 and Chymotrypsin

Anti-calculus enzyme compositions containing DNAse 1 and Chymotrypsin were formulated as provided. Two batches, Formulation I and Formulation II containing different levels of nonionic surfactant Ceteareth and water were made.

For Formulation I, the chemical ingredients disclosed in Table 2 were mixed thoroughly.

TABLE 2

Chemical ingredients for formulation I

| Stocks | Volume/amount |
|---|---|
| Glycerol | 90 ml |
| 10% Ceteareth-25 | 36 ml |
| 2% Xanthan gum | 90 ml |
| 80% sorbitol | 36 ml |
| Water | 30 ml |
| Silica | 72 g |

About 110 ml of the combined volume was discarded. The enzymes were then mixed into the solution in batches. 5 g DNase 1 (4270 Kunitz units/mg) was added to the combined solution and mixed until uniform. 5 g chymotrypsin (66.6 units/mg) was added to the solution and mixed until uniform. This step was repeated 6 times to achieve an approximate enzyme activity of DNase of 185,652.17 units/ml and Chymotrypsin activity of about 2,895.65 units/ml. The formulation was filled into capped syringes (1 ml/syringe) and refrigerated until application.

Similarly, Formulation II was formulated by initially dissolving the chemical ingredients as provided in Table 3.

TABLE 3

Chemical ingredients for formulation II

| Stocks | Volume/amount |
|---|---|
| Glycerol | 90 ml |
| 10 Ceteareth-25 | 0.36 ml |
| 2% Xanthan gum | 90 ml |
| 80% sorbitol | 36 ml |
| Silica | 72 g |

In order to control the volume for this formulation, the volume was made up to 200 ml with water. The enzymes were then mixed into the solution in batches. 5 g of DNAse 1 (3900 Kunitz units/mg) was added to the solution and mixed until uniform. Next, 5 g chymotrypsin (66.6 units/mg) was added to the solution and mixed until uniform. This step was repeated 6 times and an additional 30 ml of water was added. In order to obtain sufficient volume for trials, 50 ml of Formulation I was added to this formulation. The approximate DNAse 1 activity of the formulation was determined to be 183,300 K units/ml and chymotrypsin at 114 units of activity/ml. The formulation was filled into capped syringes (1 ml/syringe) and refrigerated until application.

Formulation II filled syringes were used in a clinical study to evaluate calculus treatment efficacy and safety profile in human subjects.

Example 5: In Vivo Study to Evaluate the Anti-Calculus Activity and Safety Profile of the Dental Formulations Safety and efficacy of the formulations comprising DNAse 1 and chymotrypsin to remove existing calculus deposits in subjects was studied. Inter- and intra-group comparisons over a 4-week trial period was conducted. A schematic of the study design is provided in FIG. 1.

Recruitment

Forty subjects were recruited for these trials. Eligibility for trails was based on the following eligibility criteria.

Inclusion Criteria

To be included in the study, each subject had to:
1. provide written informed consent to participate in the study;
2. be 18 years and older;
3. agree not to participate in any other oral/dental product studies during the course of this study and used only the assigned oral hygiene products during the entire study (including toothbrushes, toothpastes, home remedies, floss or other products like chewing gum, mouthwashes, tongue cleaners, etc.);
4. agree to refrain from the use of any elective dentistry (including a non-study dental prophylaxis) until the study had been completed;
5. agree to refrain from the use of any non-study oral hygiene and whitening products;
6. be in good general health, as determined by the investigator/designee based on a review of the health history/update for participation in the study;
7. have six mandibular anterior teeth with no crowns or veneers;
8. agree to comply with the study procedures and schedule, including the follow up visits;
9. have at least 9 mm of dental calculus on the mandibular anterior six teeth and reported that they had received a dental cleaning in previous 2-6 months.

Exclusion Criteria

Subjects were excluded from study participation if they:
1. had a medical condition requiring antibiotic premedication prior to dental procedures;
2. regularly used chlorhexidine mouth rinse;
3. had any oral condition or pathosis that could interfere with study compliance and/or examination procedures (e.g., widespread caries, chronic neglect, advanced periodontal disease);
4. had current or history of oral cavity cancer or oropharyngeal cancer;
5. were pregnant or nursing by subject report;
6. did not brush regularly;
7. had any condition that might have made it unsafe for the subject to participate in this study, at the discretion of the investigator.

Continuance Criteria

Subjects were withdrawn from the study and excluded from study analysis if they:
1. had participated in any other oral/dental product studies since the last visit;
2. had received any elective dentistry since the last visit;
3. had used any oral hygiene products other than the assigned study products;
4. had been unable or unwilling to comply with product usage instruction for any reason.

After subjects qualified under the inclusion/exclusion, their calculus condition was examined. Only subjects who had accumulation of at least 9 mm of calculus on the lingual surfaces of the six mandibular anterior teeth were eligible. The details of the protocol were discussed with each potential subject and written informed consent was obtained for all subjects before any activity related to the clinical investigations performed. Subjects could withdraw their consent at any time without prejudice. A subject accountability form was completed for each subject. If, for any reason, a subject did not complete the study, an explanation was entered on the Subject Accountability CRF.

Study Visits

The following visits were performed during the study period:

Visit 1 (Informed Consent, Baseline and Impressions):

During Visit 1 subjects received an explanation on the nature and course of the study, signed an informed consent, and received a signed copy of the consent form. After subjects signed the informed consent, the investigator performed an oral examination and reviewed the inclusion/exclusion criteria to ensure eligibility. The eligible subjects were evaluated for demographic details (including age, gender, and race), medical history and concomitant medications. Demographic information and inclusion/exclusion criteria were also obtained and captured in the appropriate Case Report Forms (CRFs). Subjects were evaluated to ensure at least 9 mm of dental calculus was present on the lingual surfaces of the six mandibular anterior teeth. Subjects who qualified were randomized to a treatment group.

Figure 2:
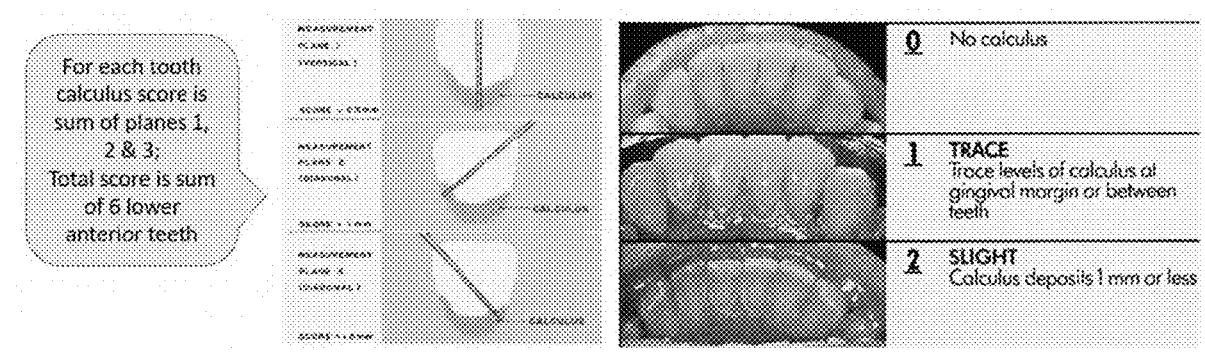

Subjects were randomly assigned to one of the three study groups by using a randomization schedule developed and maintained by an independent statistician. Subjects were stratified by baseline lingual V-MI dental calculus scores and gender (see FIG. 2).

During visit 1, all randomized subjects (with the exception of the custom tray test group who returned the following day) performed their first use, supervised at the research site.

Subjects performed at-home product use twice a day, over a period of 4 weeks. Each product use was performed according to the group instructions. The subjects received a Diary Card to document the home treatments Subjects who were randomized into the enzyme composition gel group with custom mouthguards received an impression at this visit. The dental impression of the mandibular teeth was used for the construction of an individual tooth shield for use during the clinical trial. The tooth shields were constructed from vacuum-formed mouthguard plastic. Each tooth shield was trimmed to include only the teeth and gingival margin and to eliminate contact with the cervical margin of each tooth to isolate the enzyme composition gel in contact with the hard tooth surface.

Visits 2 and 3 (2-Week and 4-Week Exams):

During visits 2 and 3 (after 2 and 4 weeks of treatment, respectively), continuance criteria were assessed and documented on the appropriate CRF. Upon verification of continuing eligibility, a safety assessment was conducted via dental examination and compliance with study protocol was evaluated. An assessment of calculus deposits was made to replicate the evaluation undertaken at visit 1.

Table 4 provides an overview of the visits:

TABLE 4

Study procedure and schedule

| Procedure | Screening/Baseline visit (Visit 1) | $2^{nd}$ and $4^{th}$ weeks ±2 days (Visits 2 & 3) |
|---|---|---|
| Subject Sign-in: | X | |
| Medical History | | |
| Informed Consent form | | |
| Current oral habits | | |
| Demographics | | |
| Concomitant Medications | | |
| Diary Card | | |
| Questionnaire | | |
| Continuance Criteria | X | X |
| Oral Soft/Hard Tissue (OSHT) evaluation | X | X |
| VMI assessment | X | X |
| Digital Photos of anterior mandibular lingual teeth | X | X |
| Randomization | X | |
| Supervised product use | $X^a$ | |
| AEs | X | X |
| Compliance check | X | X |

Identity of Investigational Products

The products used during this study are listed as follows:
1. ADA reference soft manual toothbrush: (Colgate® Classic [Pokey], Colgate-Palmolive Co., New York, NY) used with ADA Toothpaste.
2. ADA reference soft manual toothbrush: used with Formulation only.
3. Enzyme formulation: Formulation II, as provided herein.
4. ADA Accepted Standard Fluoride Toothpaste: Crest® Cavity Protection Cool Mint Gel, 0.243% Sodium Fluoride, Procter & Gamble, Cincinnati, OH 45202.

Calculus Measurement

1. Volpe-Manhold Index (V-MI) was calculated on lingual surfaces of 6 lower anterior teeth (see FIG. 2). The Volpe-Manhold Index (V-MI)[2] measures calculus present on the lingual surfaces of the lower six anterior teeth. The instrument used was a standard periodontal probe, graduated in millimeters. After drying the teeth with a stream of air, the instrument was placed on the most inferior border of visible calculus and measurements are obtained in the following three planes:
   (a) Bisecting the center of the lingual surface;
   (b) Diagonally through the mesial-incisal point angle of the tooth through the area of greatest calculus height; and
   (c) Diagonally through the distal point angle of the tooth through the area of greatest calculus height.

The Examiner then assigned a score to each measurement plane. Measurements were made in 0.5 mm increments starting at 0.5. A score of zero (0) denotes that there was no calculus present at a measurable site. The V-MI was calculated for each subject by summing the millimeter scores over all sites graded. Digital photos of the lingual surfaces of 6 lower anterior teeth were taken.

Methodology and Study Design

The study was conducted as a randomized, single-blind, single-center, parallel group, three treatment clinical trial, aimed to evaluate the safety and efficacy of enzyme formulation to remove calculus accumulations. Subjects were subjected to a Volpe-Manhold Index (V-MI) calculus examination at each visit as provided below.

Forty (40) subjects who had at least 9 mm of calculus on the lingual surface of the mandibular anterior teeth were qualified to continue participation in the study, according to the eligibility criteria. Subjects were randomly assigned to one of 3 groups (20 subjects in the control, and 10 subjects in each test group).

All treatment groups brushed with an ADA-accepted toothbrush and dentifrice for 2 minutes twice daily. The three groups followed the following regimen:

Test Group A: Brushed for two minutes with the control toothbrush and Crest twice daily.

Test Group B: Brushed for 1 minute using a toothbrush with half the amount of enzyme formulation in the syringe (1 ml/syringe). Subjects were instructed to start brushing on the lingual (tongue) side of the lower front teeth and end on those same teeth with the separate toothbrush. Subjects then brushed using the control toothpaste, expectorated, reapplied the amount remaining in the syringe, down to empty the syringe with the enzyme formulating and brushed for additional minute again starting on the tongue side of the front lower teeth and ending there after 1 minute of brushing, followed by spit, and no rinsing. Brushing with enzyme formulation was done for a minimum of 30 minutes prior to the control toothbrushing. Subjects were asked to expectorate but not to rinse after using enzyme formulation for at least 30 minutes. Subjects then brushed for two minutes with the control toothbrush and Crest twice daily. In total, the subjects brushed their teeth four times daily, twice with enzyme formulation and twice with Crest. The control toothbrush was rinsed with hot water daily to clean.

Test Group C: Prior to using the custom tray, subjects brushed for 1 minute by applying half of the syringe (1 ml/syringe) using a separate toothbrush designated for enzyme formulation only, followed by spitting and no rinsing. A custom-made tray was filled with enzyme formulation from a second syringe and the tray was worn for 30 minutes once daily. The tray was removed, the subject then brushed for one minute with the remaining enzyme formulation from the first syringe, expectorated, without rinsing for a minimum of 30 minutes. Subjects completed the oral care routine by brushing with the control toothbrush and toothpaste (Crest) for two minutes twice daily. The control toothbrush was rinsed with hot water daily to clean.

Subjects were stratified according to calculus levels and gender obtained during the screening/baseline examination. Subjects brushed twice daily, unsupervised, during a 4-week test period, returning at 2-weeks and 4-weeks for safety and V-MI examinations.

Assessment and Data Collection

The study test phase included a total of 56 treatment sessions and 3 clinical visits over a period of 4 weeks. For each subject, assessment data was collected at baseline, 2 and 4 weeks. The average data sets were calculated for each group.

Study Endpoints and Efficacy Assessment:

The following endpoints were set for the study:

Primary Endpoints:
1. A significant calculus reduction in the test groups as compared to the control group following 4-weeks of treatment.
2. A significant calculus reduction in the test groups as compared to longitudinal intra-group values.
3. Safety assessment based on adverse events in either test group following 4 weeks of treatment.
4. A decrease in calculus by removal of existing deposits and/or prevention of new deposits.

Secondary Endpoints:
1. Prevention of calculus accumulation in the treatment group, as seen by no significant increase in calculus score as compared to baseline.
2. A significant calculus reduction in the test groups as compared to the control group following 2-weeks of treatment.

Exploratory End Points
1. Any difference in patient's mouth-feel when they rub their tongue on the back of their front teeth?
2. Any improvement in patient's breath?
3. Any change in teeth appearance or color Safety Analysis A safety analysis set was conducted, including all subjects using the experimental gel at least a single time. A Performance analysis set consisted of all subjects providing at least one post treatment performance measurement. Only observed data was used; missing data was not imputed.

Subject Disposition

The safety analysis set was used for describing subject disposition.

Subject disposition was tabulated; the number of enrolled, exposed, prematurely terminated and completed subjects were summarized. A list of dropouts/terminations was prepared including reason for discontinuation, and time of discontinuation.

Safety Analyses

Safety analyses was descriptive in nature, with SAE's and AEs tabulated by body system, preferred term, severity and relation to investigational gel. Where relevant, events were related to remote log file data. In addition, safety complaints, as described by the subjects were described and investigated.

Oral cavity examination was done according to OSHT—Oral Soft & Hard Tissue Assessment. Assessment of the oral soft and hard tissue was conducted via a visual examination of the oral cavity and perioral area utilizing a standard dental light, dental mirror, and gauze. The structures examined included the gingiva (free and attached), hard and soft palate, oropharynx/uvula, buccal mucosa, tongue, floor of the mouth, labial mucosa, mucobuccal/mucolabial folds, lips, teeth, and peroral area. All abnormal findings which had the potential to be product-related and were noted after product assignment, which were not documented at baseline, or were present at baseline but had worsened during product usage, were recorded on the AE CRF.

Performance Analyses

Efficacy was determined by reduction of dental calculus within treatment groups (longitudinal analysis) and between groups as compared to the control group following 4 weeks of treatment. Additionally, efficacy was determined by the prevention of calculus accumulation in the treatment group, as seen by no significant increase in calculus score as compared to baseline.

The primary outcome was calculated using the Volpe-Manhold Index, and all other variables were considered secondary. The calculus scores for this index were summed to provide a total score per mouth at each clinical examination. While the analyses was performed at other measurement time points during the study, the primary timepoint was at the conclusion of the trial after 4 weeks of product use.

Statistical significance of mean data for age and scoring index was determined parametrically by analysis of variance for testing of differences between the product groups. Intergroup comparisons for each parameter were made by means of multiple range tests with compensation for gender, if necessary. Data from all subjects who completed the final assessment were used in the analysis.

The data for each scoring index was also analyzed by analysis of covariance using the baseline data as the covariate. The covariate (baseline data) was included in the statistics model for increased precision in determining the effect of the test products on the scores. The adjusted means generated by this procedure compensated for any variations between treatment groups that existed in the baseline data. This reduced variability and increased power, and also adjusted for imbalances at baseline due to subject attrition.

Longitudinal (i.e., within-treatment) comparisons were performed for VMI means using a one-sample t-test on the changes from baseline to the final examination.

All comparisons were tested at an overall 0.05 level of significance using 2-sided tests. Summary statistics were provided at all timepoints. Safety data was summarized. Adverse events experienced by all subjects receiving test products were included in the safety analyses. All cases were checked for compliance with the study protocol, and for accuracy and completeness. Those cases which did not meet these requirements were excluded from primary analyses.

Post-power analyses for those endpoints that were determined to not be statistically significant were undertaken. Thus, sample sizes needed for a properly powered study were determined.

All adverse events reported were listed, documenting course, outcome, severity, and possible relationship to study products. Comparisons among the treatment groups were made by tabulating the frequency of subjects with one or more adverse events during the trial. If required, likelihood ratio chi square tests were used to compare the frequency of subjects experiencing adverse events among treatment groups.

All subjects who completed the study showed satisfactory compliance. Forty subjects were randomized and thirty-eight completed the study. Among the randomized subjects 22 were females and 18 were males. The mean age was 50.4 with the minimum age being 23 years and the maximum being 74 years. Calculus baseline scores were comparable for all treatments.

Oral Tissue Exam

The examination of the oral cavity included the gingival (free and attached), hard and soft palate, oropharynx, buccal mucosa, tongue, floor of the mouth, labial mucosa, mucobuccal/mucolabial folds, lips and perioral area was undertaken. There were no observed and/or reported evidence of any hard or soft tissue damage associated with the use of test product. A summary of the adverse events seen during examination or self-reported by the subject are provided in Table 6.

TABLE 6

Adverse events summary

| # | Group | Examiner or Self Report | AE | AE Rating | Related to product | Resolved within 5 days | Resolved on treatment |
|---|---|---|---|---|---|---|---|
| 1019 | A | Examiner | Abrasion (toothbrush) on gingival margin #26 | Mild | Likely caused by toothbrushing | Yes | Yes |
| 1024 | B | Examiner | Erythema on gingival margin #27 | Mild | Likely caused by toothbrushing | Yes | Yes |
| 1032 | B | Examiner | Erythema on gingival margin #24 & 28 | Mild | Likely caused by toothbrushing | Yes | Yes |
| 1044 | B | Examiner | Inflamed papilla on anterior of tongue | Mild | Possibly | Yes | No |
| 1013 | C | Examiner | Erythema on gingival margin #23-26 | Moderate | Likely caused by toothbrushing | Yes | Yes |
| 1044 | | Self Report | Burning tongue | NA | Possibly | Yes | No |
| 1012 | C | Self Report | Gum Sensitivity | NA | Possibly | Yes | Yes |
| 1012 | C | Self Report | Lip Sensitivity | NA | Possibly | Yes | Yes |

Results

Study Population/Enrollment:

The final list of subject enrollments is provided in Table 5:

TABLE 5

Enrollment and withdrawal data

| Subjects | # |
|---|---|
| Recruited/Scheduled | 44 |
| Cancelled/No show | 0 |
| Subjects Consented | 44 |
| Screening/Baseline Failures | 4 |
| Randomized to Product | 40 |
| Received Product | 40 |
| Disqualified/Dropped | 2 |
| Completed | 38 |
| Subject Withdrawal/Disqualification | 2 |

All adverse events resolved within the 5-day re-evaluation period. All adverse events (examiner and self-Reported) observed in test groups B & C were attributed to the test product. The Erythema was most likely caused by the 4 toothbrushing procedures each day compared to twice daily toothbrushing in the control group. The adverse event for Subject 1019 was toothbrush abrasion.

Clinical Study Results

Figure 3:
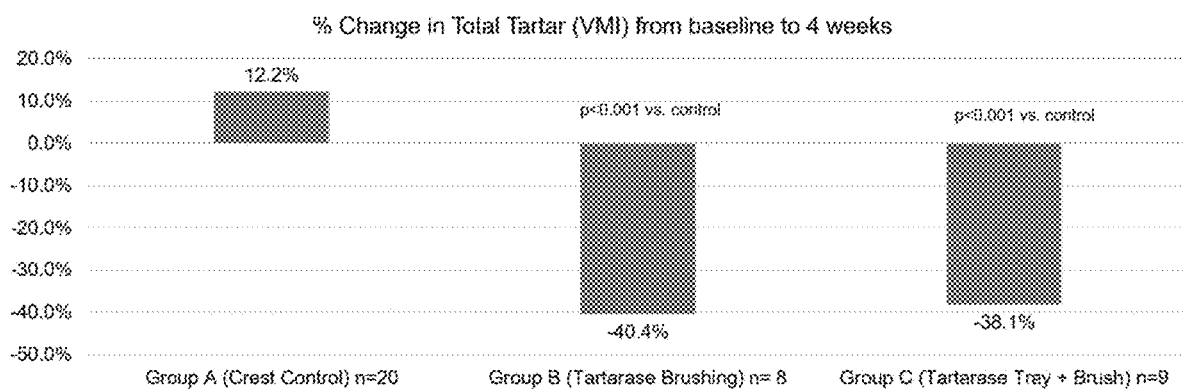
FIG. 3 shows that the formulation significantly reduced total tartar as estimated by Volpe-Manhold scores.

A summary of data for the Volpe-Manhold Index scores and change from baseline to Week 4 for each of the three treatments is provided in Table 7 and Table 8 and FIG. 3. Both treatments with enzyme formulation reduced calculus over the 4-week study. Treatment with enzyme formulation alone reduced calculus by 40.0% and the treatment with enzyme formulation plus custom tray with the enzyme formulation reduced calculus by 38.1% over the 4-week study. The longitudinal intra-group analysis results indicated that the two groups treated with enzyme formulation groups had statistically significant calculus reductions over the 4-week study ($p<0.001$). The reductions for both groups were comparable. In comparison, the control group showed increase in calculus by a statistically significant 12.2% over the 4-week study ($p<0.001$). The 2-week reduction for the group treated with enzyme formulation group was 0.8% and 1.6% for the group treated with enzyme formulation plus the custom tray.

TABLE 7

Volpe-Manhold index scores

| Variable | n | mean | std | stderr | median | min | max | range |
|---|---|---|---|---|---|---|---|---|
| Tatarase Group (B) | | | | | | | | |
| Baseline | 8 | 16.6 | 7.89 | 2.79 | 13.5 | 11.5 | 35.0 | 23.5 |
| Week 2 | 8 | 16.4 | 7.95 | 2.81 | 13.3 | 11.5 | 35.0 | 23.5 |
| Week 4 | 8 | 9.9 | 8.44 | 2.98 | 6.8 | 3.5 | 29.5 | 26.0 |
| Tatarase Plus Custom Tray Group (C) | | | | | | | | |
| Baseline | 9 | 17.5 | 10.16 | 3.39 | 13.0 | 9.0 | 39.0 | 30.0 |
| Week 2 | 9 | 17.2 | 10.32 | 3.44 | 12.5 | 8.0 | 39.0 | 31.0 |
| Week 4 | 9 | 10.8 | 10.09 | 3.36 | 5.5 | 2.5 | 28.0 | 25.5 |
| Control Group (A) | | | | | | | | |
| Baseline | 20 | 17.3 | 5.33 | 1.19 | 17.0 | 10.0 | 26.5 | 16.5 |
| Week 2 | 20 | 17.4 | 5.19 | 1.16 | 17.0 | 10.0 | 26.5 | 16.5 |
| Week 4 | 20 | 19.4 | 5.62 | 1.26 | 18.5 | 11.0 | 29.0 | 18.0 |

TABLE 8

Changes in Volpe-Manhold Index Scores over 4 weeks

VMI Scores & Change (%) at Week 4

| | Baseline VMI | Week 2 VMI | Week 4 VM1 | Change at Week 4 |
|---|---|---|---|---|
| Group A | 17.3 | 17.4 | 19.4 | 12.2% increase |
| Group B | 16.6 | 16.4 | 9.9 | 40.4% reduction |
| Group C | 17.5 | 17.2 | 10.8 | 38.1% reduction |

Table 9 indicates that the two treatments with enzyme formulation showed statistically superior calculus reduction compared to the Control group ($p<0.001$).

TABLE 9

ANCOVA for VM-I Calculus Scores at Week 4

| Contrast | LSMean Difference | LSMean Difference Lower CI | LSMean Difference Upper CI | p-value |
|---|---|---|---|---|
| Group A minus Group C | 8.8 | 7.0 | 10.5 | <0.001 |
| Group A minus Group B | 8.8 | 7.0 | 10.6 | <0.001 |
| Group C minus Group B | 0.03 | −2.1 | 2.1 | 0.977 |

LSMean Difference = Mean difference of the covariate adjusted treatment means
p-value = p-value of the test of the LSMean difference
LSMean Difference Lower/Upper CI = 95% Confidence Limit Upper/Lower Bound Table 10 provides the week 4 analysis of the covariance results. As shown in Table 8, neither of the two groups with active enzyme formulation treatment showed clinically as well as statistically significant reductions at Week 2. The confidence intervals provided in Table 9 indicates that the groups with dental treatments were significantly superior in calculus reduction compared to the control group.

TABLE 10

Week 4 Analysis of Covariance Results for Volpe-Manhold Index

| Effect | Estimate | Std error | T value | Pr > \|t\| | Alpha | Lower | Upper |
|---|---|---|---|---|---|---|---|
| Group A minus Group C | 8.7642 | 0.8490 | 10.32 | <.0001 | 0.05 | 7.0370 | 10.4914 |
| Group A minus Group B | 8.7942 | 0.8854 | 9.93 | <.0001 | 0.05 | 6.9929 | 10.5955 |
| Group B minus Group C | 0.0300 | 1.0287 | 0.03 | 0.9769 | 0.05 | −2.0629 | 2.1229 |

Safety (Week 2 and Week 4)

The oral soft and hard tissue examination (OSHT) was conducted at baseline, week 2 and week 4. All findings at week 2 and week 4 were continuations of pre-conditions noted at baseline with the exception of the 4 participants (#1019, #1024, #1032, #1013) as shown in Table 6.

Example 8: Summary of Results

The results from the study show that the use of disclosed enzyme formulation was well tolerated by study participants.

Figure 4:
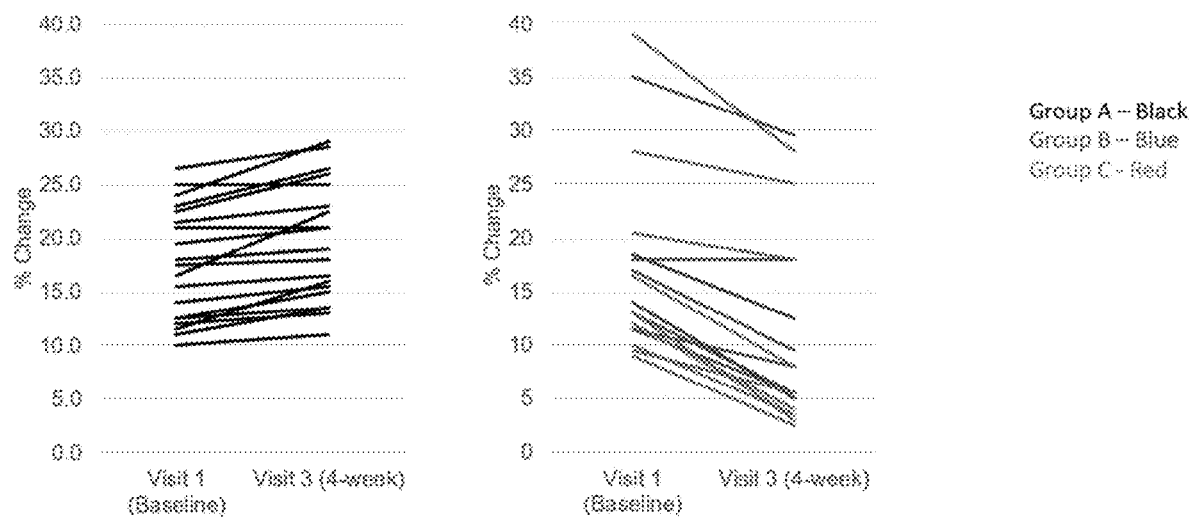
FIG. 4 shows the % change in tartar across all the subjects of the trial. Change in tartar was consistent across all subjects; every control patient increased in tartar and all, but one subject showed reduced tartar.
Figure 5:
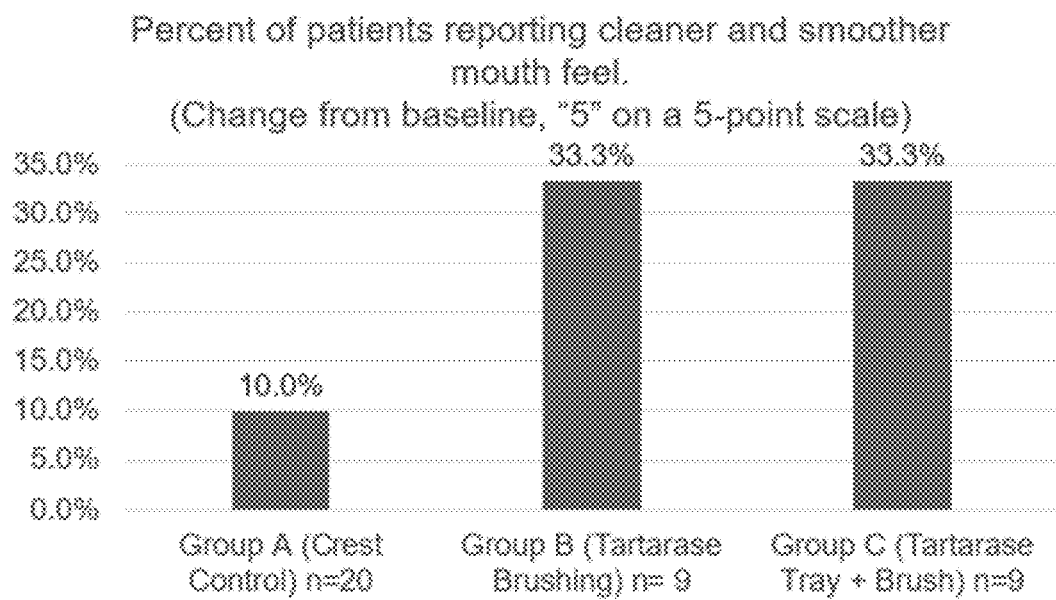
FIG. 5 is a graph showing the positive reaction of subjects on the disclosed formulation.

The study participants showed clinically meaningful and statistically significant reductions of calculus over the 4-week study (FIG. 4). Further, the participants in the active treatment groups gave a more favorable response to how clean their teeth felt. The positive endorsements were given by 75% of the Group B (enzyme formulation) and 67% of the Group C (enzyme formulation plus tray) compared to the control group, participants of which only gave a 50% endorsement (data not shown). Additionally, the groups B and C reported that their teeth felt cleaner, smoother, and less gritty (FIG. 5).

Example 9: Further Analysis of Dental Tartar/Calculus Composition and Structure

Calculus, harvested from teeth using metal alloy dental picks was placed in 0.5 mL of water in 1.5 mL microfuge tubes. The calculus was pulverized using a Teflon pestle fitted to the microfuge tube. The contents were centrifuged, the supernatant aspirated and re-suspended in 1 mL water, and 100 microliter aliquots were drawn and placed in one or more microfuge tubes. The contents of each tube were centrifuged, supernatant aspirated and then re-suspended in 300 microliters of water in a tube containing one of the following:
  Nothing added (Water control)
  Trypsin
  Chymotrypsin
  DNase 1
  Nucleanase
  "Genius Nuclease"

The contents of each tube were mixed and incubated for 30 minutes at about 37° C. The contents were centrifuged, and the supernatant removed and analyzed for the presence and amount of protein, DNA and calcium. Raw quantifications were multiplied by a dilution factor (e.g., 1:3 for calcium, 1:5 for DNA, or 1:5 for protein) to achieve a total amount of protein, DNA or calcium isolated in the sample. Table 11 shows results obtained. The results shown in Table 11 indicate that Chymotrypsin and DNAase 1 were more effective than Trypsin or the other nucleases in extracting protein, DNA or calcium for calculus.

TABLE 11

Percentages of perceived maximum product yields

|  | Protein (% of control) | DNA (% of control) | Calcium (% of control) |
|---|---|---|---|
| Control | 100 | 100 | 100 |
| Trypsin | 397 | 691.7 | 241.6 |
| Chymotrypsin | 7225.2 | 1125 | 550 |
| DNAase 1 | 3137.8 | 900 | 258.3 |
| Nucleanase | 557.4 | 300 | 50 |
| "Genius Nuclease" | 173.8 | 0 | 25 |

SEQUENCES:

| SEQ ID | TYPE | SOURCE | SEQUENCE |
|---|---|---|---|
| 1 | Protein | Bos Taurus DNAse 1 | MRGTRLMGLLLALAGLLQLGLSLKIAAFNIRTF GETKMSNATLASYIVRIVRRYDIVLIQ EVRDSHLVAVGKLLDYLNQDDPNTYHYVVSE PLGRNSYKERYLFLFRPNKVSVLDTYQYD DGCESCGNDSFSREPAVVKFSSHSTKVKEFA IVALHSAPSDAVAEINSLYDVYLDVQQKW HLNDVMLMGDFNADCSYVTSSQWSSIRLRTS STFQWLIPDSADTTATSTNCAYDRIVVAG SLLQSSVVPGSAAPFDFQAAYGLSNEMALAIS DHYPVEVTLT |
| 2 | Protein | Bos Taurus Chymotrypsinogen | CGVPAIQPVLSGL SRIVNGEEAVPGSWPWQVSLQDKTGFHFCG GSLINENWVVTAAHCGV TTSDVVVAGEFDQGSSSEKIQKLKIAKVFKNS KYNSLTINNDITLLKLSTAASFSQTVSA VCLPSASDDFAAGTTCVTTGWGLTRYTNANT PDRLQQASLPLLSNTNCKKYWGTKIKDAM ICAGASGVSSCMGDSGGPLVCKKNGAWTLV GIVSWGSSTCSTSTPGVYARVTALVNWQQ TLAAN |
| 3 | Protein | Artificial Chymotypsin chain A | CGVPAIQPVLSGL |
| 4 | Protein | Artificial Chymotypsin chain B | SRIVNGEEAVPGSWPWQVSLQDKTGFHFCG GSLINENWVTAAHCGV TTSDVVVAGEFDQGSSSEKIQKLKIAKVFKNS KYNSLTINNDITLLKLSTAASFSQTVSA VCLPSASDDFAAGTTCVTTGWGLTRY |
| 5 | Protein | Artificial Chymotypsin chain C | ANTPDRLQQASLPLLSNTNCKKYWGTKIKDA MICAGASGVSSCMGDSGGPLVCKKNGAWTL VGIVSWGSSTCSTSTPGVYARVTALVNWVQQ TLAAN |
| 6 | Protein | Bos Taurus Beta-galactosidase | MPGVVRLLALLLVPLLLGSARGLHNATQRTFQ IDYRRNRFLKDGQPFRYISGSIHYFRVP RFYWKDRLLKMKMAGLNAIQTYVAWNFHELQ PGRYNFSGDHDVEHFIQLAHELGLLVILR PGPYICAEWDMGGLPAWLLEKKSIVLRSSDP DYLAAVDKWLGVLLPKMRPLLYKNGGPII |

-continued

| SEQUENCES: | | | |
|---|---|---|---|
| SEQ ID | TYPE | SOURCE | SEQUENCE |
| | | | TVQVENEYGSYLSCDYDYLRFLQKRFHDHLG
EDVLLFTTDGVNERLLQCGALQGLYATVD
FSPGTNLTAAFMLQRKFEPTGPLVNSEFYTG
WLDHWGQRHSTVSSKAVAFTLHDMLALGA
NVNMYMFIGGTNFAYWNGANIPYQPQPTSYD
YDAPLSEAGDLTEKYFALRDIIQKFAKVP
EGPIPPSTPKFAYGKVALNKLKTVEDALNILCP
SGPIKSVYPLTFIDVKQYFGFVLYRTM
LPEDCSDPTPLSSPLSGVHDRAYVSVNGVAQ
GILERESVITLNITGKAGATLDLLVENMG
RVNYGSSINDFKGLVSNLTLGSKILTNWEIFPL
DMEDAVRSHLGTWGGRDRGYHNKARAH
SPPTYALPTFYVGNFTIPSGIADLPQDTFIQFP
GWTKGQVWINGFNLGRYWPVRGPQMTL
FVPQHILVTSTPNTIVVLELEHAPCQDGGPEL
CTVEFVDKPVFRTVQTHRHAN |

What is claimed is:

1. A dental composition comprising:
   a. a DNase in an amount in Kunitz units/mL of about 50,000 to about 250,000;
   b. chymotrypsin or a functional variant or derivative thereof present in functional units in an amount of about 100 to about 5,000 units/mL; and
   c. an orally acceptable additive, carrier or excipient or any combination thereof.

2. The dental composition of claim 1, wherein the composition further comprises β-galactosidase.

3. The dental composition of any one of claim 1, wherein the DNAse is present in an amount in Kunitz units/mL of about 100,000 to about 200,000, or about 150,000 to about 200,000, or 150,000, or 160,000, or 170,000, or 180,000, or 185,000 or 190,000, or 200,000.

4. The dental composition of claim 1, wherein the DNAse is DNAse I or a functional variant or derivative thereof.

5. The dental composition of claim 1, wherein chymotrypsin or a functional variant or derivative thereof is present in functional units based on the rate of hydrolysis of a chromogenic substrate in an amount of about 500 to about 4,000, or about 1000 to about 3000, or 1,500, or 1,600, or 1,700, or 1,800, or 1,900, or 2,000, or 2,100, or 2,200, or 2,300, or 2,400, or 2,500, or 2,600, or 2,700, or 2,800, or 2,900 or 3,000 units/mL.

6. The dental composition of claim 1, wherein the orally acceptable additive is a thickener and/or a gelling agent selected from gellan gum (low acyl or high acyl), glycerol, sorbitol, silica, guar gum, xanthan gum, polyethylene glycols, polyvinyl pyrrolidones and co-polymers thereof, polylactic acids, polyglycolic acids, long chain fatty acid alcohols, cellulose-based polymers, acrylate polymers and any combination thereof.

7. The dental composition of claim 1, wherein the orally acceptable carriers is selected from glycerol and sorbitol.

8. The dental composition of claim 1, further comprising a surfactant selected from Ceteareth or Steareth.

9. The dental composition of claim 1, wherein the composition comprises:
   a. DNase I or a functional variant or derivative thereof,
   b. Chymotrypsin or a functional variant or derivative thereof;
   and one or more of,
   c. 10-20% glycerol,
   d. 0.00001-0.000001% Ceteareth-25,
   e. 0.1%-0.5% Xanthan gum,
   f. 1-10% sorbitol, and
   g. 5-25% silica.

10. The composition of claim 9, further comprising water.

11. An oral hygiene device comprising the composition of claim 1, wherein the composition is combined with a dental tray, a capsule applicator, an oral pick or a dental floss.

12. A method of removing calculus dentalis in a subject in need thereof, comprising applying the oral hygiene device of claim 11 in the subject.

13. The method of claim 12, wherein the subject is a mammal.

14. The method of claim 12, wherein the subject is a human.

15. A method for reducing or removing calculus dentalis in a subject in need thereof, the method comprising contacting a tooth surface with an effective amount of a composition comprising:
   a. DNAse I or a functional variant or derivatives thereof in an amount in Kunitz units/mL of about 50,000 to about 250,000, and
   b. chymotrypsin or a functional variant or derivative thereof present in functional units in an amount of about 100 to about 5,000 units/mL;
wherein the calculus dentalis is reduced by about 15% to 40% within about 2-4 weeks.

16. The method of claim 15, wherein the composition further comprises β-galactosidase.

17. The method of claim 15, wherein the composition further comprises an orally acceptable additive, carrier or excipient or a combination thereof.

18. The method of claim 15, wherein the composition comprises a paste or a liquid and contacting a tooth surface comprises application of the composition using a brush, a tray, by oral rinse or any combination thereof.

19. The method of claim 18, wherein the method comprises at least once daily, at least twice daily or at least three-times daily applications for a period of at least a week.

20. A kit comprising:
   a. a composition of claim 1;
   b. instructions for use;
   c. at least one applicator selected from a toothbrush, an oral pick, a dental floss, and a dental tray.

21. The dental composition of claim 1, wherein the composition when administered to a subject in need thereof reduces calculus *dentalis* by about 15% to 40% within about 2-4 weeks.

* * * * *